United States Patent
Xin et al.

(10) Patent No.: US 11,405,958 B2
(45) Date of Patent: Aug. 2, 2022

(54) ENHANCED DISTRIBUTED CHANNEL ACCESS (EDCA) QUEUE FOR REAL TIME APPLICATION (RTA) PACKETS

(71) Applicant: SONY GROUP CORPORATION, Tokyo (JP)

(72) Inventors: Liangxiao Xin, San Jose, CA (US); Mohamed Abouelseoud, Burlingame, CA (US)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/099,261

(22) Filed: Nov. 16, 2020

(65) Prior Publication Data
US 2021/0337594 A1 Oct. 28, 2021

Related U.S. Application Data

(60) Provisional application No. 63/013,776, filed on Apr. 22, 2020.

(51) Int. Cl.
*H04W 74/08* (2009.01)
*H04W 74/04* (2009.01)
(Continued)

(52) U.S. Cl.
CPC ......... *H04W 74/0816* (2013.01); *H04L 47/50* (2013.01); *H04W 40/02* (2013.01); *H04W 74/04* (2013.01); *H04W 84/12* (2013.01)

(58) Field of Classification Search
CPC . H04W 74/0816; H04W 40/02; H04W 74/04; H04W 84/12; H04L 47/50
See application file for complete search history.

(56) References Cited

U.S. PATENT DOCUMENTS

2013/0201996 A1* 8/2013 Masputra ............ H04L 47/6215
370/412
2014/0112306 A1 4/2014 Zhou
(Continued)

FOREIGN PATENT DOCUMENTS

CN 101931954 A 12/2010
GB 2555143 A 4/2018

OTHER PUBLICATIONS

Tariq, A. S. M. et al., "Analysis of internal Collision and Dropping Packets Characteristics of EDCA IEEE802.11e Using NS-2.34 Simulator", Proceedings of the World Congress on Engineering and Computer Science 2010 vol. I WCES 2010, Oct. 20-22, 2010, pp. 1-4.

*Primary Examiner* — Mohammad S Anwar
(74) *Attorney, Agent, or Firm* — O'Banion & Ritchey LLP; John P. O'Banion

(57) ABSTRACT

A wireless local area network (WLAN) supporting real-time application (RTA) packets that are sensitive to communication delays as well as non-real time packets over a network supporting carrier sense multiple access/collision avoidance (CSMA/CA) using enhanced distributed channel access (EDCA) in an EDCA queue system. At least one new access class (AC) and associated transmit queue for enqueuing RTA packets while non-RTA packets are enqueued to the original transmit queues in the EDCA queue system. A new EDCA function (EDCAF) is created for the new access class (AC) transmit queue for RTA packets in which the RTA queue is able to contend for channel before expected RTA packets arrival.

20 Claims, 15 Drawing Sheets

(51) Int. Cl.
 *H04L 47/50* (2022.01)
 *H04W 40/02* (2009.01)
 *H04W 84/12* (2009.01)

(56) References Cited

U.S. PATENT DOCUMENTS

2016/0119953 A1    4/2016  Merlin
2017/0111854 A1    4/2017  Ho
2018/0110065 A1*   4/2018  Lin ................... H04W 72/1289
2018/0199375 A1*   7/2018  Nezou ................ H04W 74/006

* cited by examiner

| Element ID | Length | RTA-TS Info | Nominal MSDU Size | Maximum MSDU Size | Minimum MSDU Size | Mean Data Rate | Peak Data Rate | Burst Size |
|---|---|---|---|---|---|---|---|---|
| Service Start Time | Service End Time | Inactivity Interval | MSDU Lifetime | Deterministic Service | Delay Bound | Reliability | Jitter | Nominal Service Interval |
| Minimum Service Interval | Maximum Service Interval | Minimum PHY Rate | Surplus Bandwidth Allowance | Medium Time | | | | |

FIG. 4

| Traffic Type | TSID | Direction | Access Policy | Aggregation | APSD | RTA Priority | TSInfo Ack Policy | Retry Policy | Schedule | Reserved |
|---|---|---|---|---|---|---|---|---|---|---|

FIG. 5

ENHANCED DISTRIBUTED CHANNEL ACCESS (EDCA) QUEUE FOR REAL TIME APPLICATION (RTA) PACKETS

CROSS-REFERENCE TO RELATED APPLICATIONS

This application claims priority to, and the benefit of, U.S. provisional patent application Ser. No. 63/013,776 filed on Apr. 22, 2020, incorporated herein by reference in its entirety.

STATEMENT REGARDING FEDERALLY SPONSORED RESEARCH OR DEVELOPMENT

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to wireless network communications, and more particularly to increasing the priority of real time application packets being communicated over the wireless network.

2. Background Discussion

Current wireless technologies using CSMA/CA focus on high throughput network performance but do not support enhancing low latency capabilities. This creates a large technology gap since a growing number of applications, such as real time applications (RTA), which require low latency performance, but are being transmitted by a protocol which is only directed to reaching high throughput levels.

Data generated from an RTA is called RTA traffic and will be packetized as RTA packets at the transmitter station (STA). Also, the data generated from the non-time sensitive application is called non-RTA traffic and will be packetized as non-RTA packets at the transmitter STA.

The RTA packets require low latency due to their high timeliness requirement on packet delivery. An RTA packet is generally only valid if it is delivered within a certain period of time. In Carrier-Sense Multiple-Access/Collision Avoidance (CSMA/CA) wireless technology, a STA can use Enhanced Distributed Channel Access (EDCA) to let high priority traffic gain a higher priority with an increase probability of transmission earlier than low priority traffic. These existing technologies, however, still fail to meet the timeliness requirement of RTA packets as they do not minimize the latency of RTA packet transmissions.

Accordingly a need exists for handling RTA packets with reduced latency. The present disclosure fulfills that need and provides additional benefits over previous technologies.

BRIEF SUMMARY

The present disclosure separates the transmit queues for RTA packets from non-RTA packets, while non-RTA packets can still use the regular transmit queues defined in the Enhanced Distributed Channel Access (EDCA) queue system of IEEE 802.11.

Stations (STAs) are able to discern between RTA packets and non-RTA packets, and RTA packets are given a higher priority than other packets except for Network Control (NC) packets. Thus the RTA packets will be generally transmitted earlier than the other packets except for NC packets. If an RTA packet has an internal access conflict within the station with an NC packet, then the NC packet gains channel access. Otherwise, the RTA packet gains channel access when internal access conflicts arise.

The presently disclosed protocol does not increase the contention window for RTA packets when an access conflict arises, thus RTA packet retransmissions do not incur further latency penalties. In addition, when channel access contention is performed for RTA packets, the contention can be performed/commenced prior to the arrival of the RTA packets from the higher levels of the protocol (e.g., application layer).

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

FIG. 4 is a data field diagram of an RTA-Traffic Specification (TSPEC) element according to at least one embodiment of the present disclosure.

FIG. 5 is a data field diagram of an RTA-Traffic Stream (TS) element according to at least one embodiment of the present disclosure.

DETAILED DESCRIPTION

1. Introduction to Reference Model EDCA Queue System

EDCA is defined in IEEE 802.11e standard to meet the Wi-Fi Quality of Service (QoS) requirements. It classifies the traffic into different access categories (AC) in terms of priority. The AC with higher priority has shorter average channel contention time so that its traffic can access the channel more often. Each AC has its own transmit queue to order the packets in the queue for transmission. When there is a large amount of traffic in one AC, the packets in that queue have to wait to gain channel access one by one. The waiting time of a packet in the queue can be significant leading to increased packet latency.

Figure 1:
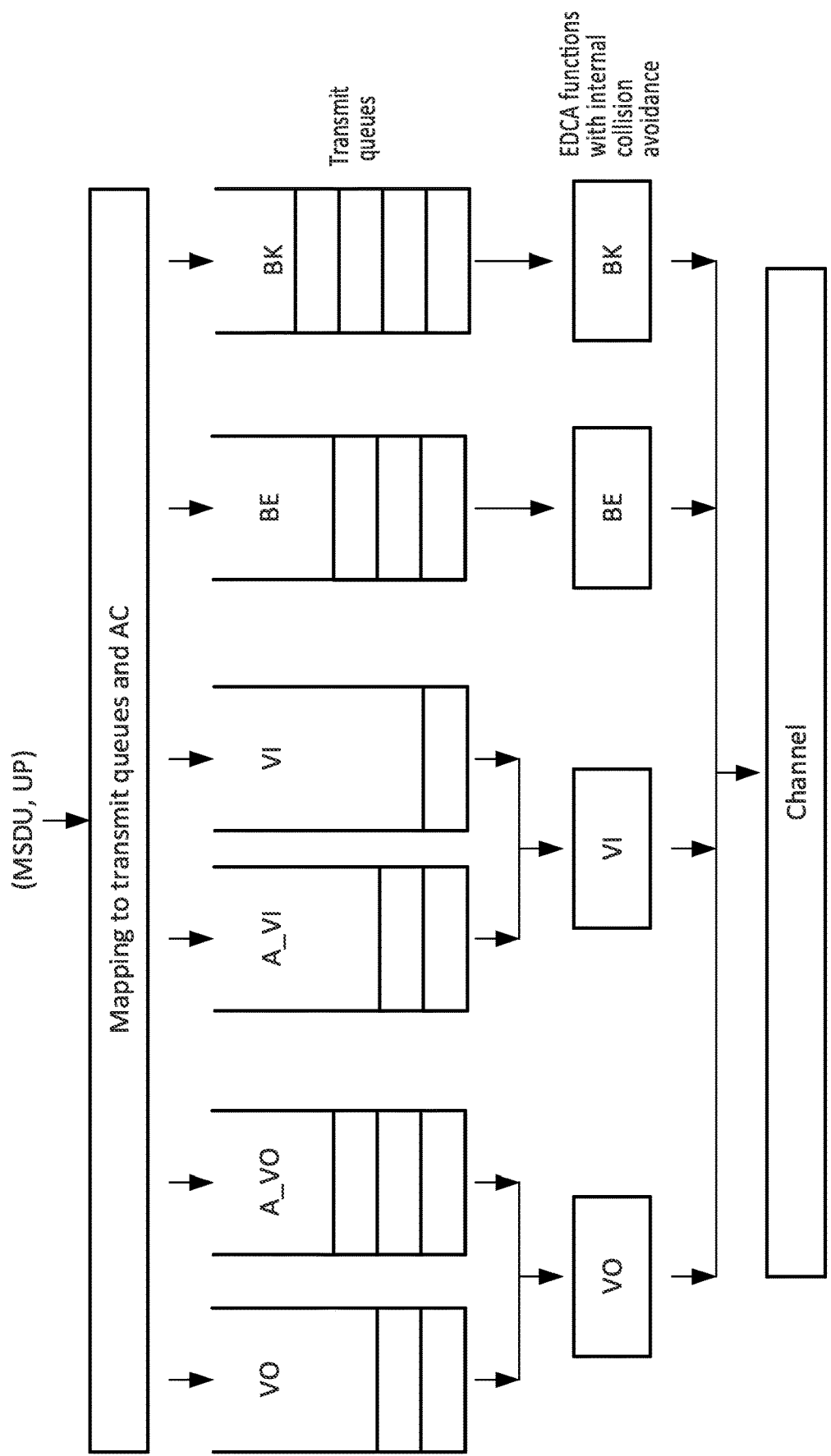
FIG. 1 is a queue flow diagram for a reference model of the Enhanced Distributed Channel Access (EDCA) queues in IEEE 802.11.

FIG. 1 illustrates the reference model of the EDCA queue system in IEEE 802.11. The system contains six transmit queues in four access categories (ACs). Each AC uses an EDCA function (EDCAF) to contend for channel access in transmitting the packets from its corresponding transmit queues.

The six transmit queues are voice (VO), alternate voice (A_VO), alternate video (A_VI), video (VI), best effort (BE), and background (BK). Each transmit queue decides the transmission order of the packets in the queue.

The four ACs are voice (VO), video (VI), best effort (BE), and background (BK). Each AC has an EDCA function (EDCAF) to provide the function of channel contention. An internal collision avoidance mechanism is used when multiple EDCAFs try to access the channel at the same time. When the internal collision occurs, the EDCAF with higher priority gains channel access.

Table 1 lists the UP-to-AC mapping used in EDCA queue of IEEE 802.11. The second and third columns represent the user priorities of the traffic and their corresponding designations in IEEE 802.1D. In each row, according to the user priority, the traffic will be enqueued in the corresponding transmit queue and access category. The priority increases from the top row to the bottom row. The traffic with higher priority has a higher probability of being transmitted earlier.

2. Problem Statement

The current wireless communication systems using CSMA/CA do not identify RTA packets from non-RTA packets and all the packets use the same random channel access scheme under CSMA/CA.

The EDCA queue system based on CSMA/CA classifies the traffic streams into different ACs in terms of priority. On average, the packets with high priority have shorter backoff times to access the channel earlier than the packets with lower priority. However, it is not guaranteed that the packets with higher priority are always transmitted first, especially when the channel is required for RTA packet traffic.

The EDCA queue system based on CSMA/CA does not consider the worst-case latency of packet transmission. The waiting time of a packet in the current queue system can have a significant impact on the worst-case latency.

3. Contribution of the Present Disclosure

To reduce RTA packet latency caused by the queue system, the present disclosure adds at least one new transmit queue in the EDCA queue system which is dedicated for RTA packets only. The task of adding an RTA transmit queue in the EDCA queue system is more challenging due to the coexistence of the RTA traffic and non-RTA traffic. The challenge in this process can be summarized as: (1) identifying between RTA packets and non-RTA packets; (2) pushing RTA packets into the RTA transmit queues, and the non-RTA packets into the non-RTA transmit queues (i.e., EDCA queues); (3) coordinating channel access between RTA and non-RTA transmit queues; and (4) handling internal collisions between queues attempting to gain access to the channel.

The use of one or more RTA transmit queues considers the time-validity of RTA traffic and minimizes its latency by reducing waiting time of RTA traffic in the transmit queue where RTA and non-RTA traffic coexist in a wireless network.

By utilizing the proposed technologies, STAs are able to identify RTA packets from non-RTA packets, and separate the transmit queues for RTA packets from non-RTA packets, while non-RTA packets can still use the regular transmit queues defined in the EDCA queue system of IEEE 802.11.

The present disclosure provides RTA packets with a higher priority than other packets, except for Network Control (NC) packets. That is, the RTA packets are given a higher probability of being transmitted earlier than other packets, except for NC packets. If an RTA packet has an internal collision with an NC packet, then the NC packet gains channel access. Otherwise, the RTA packet gains channel access when an internal collision occurs.

The present disclosure is configured for not increasing the contention window for RTA packets when the RTA packet is blocked from transmission due to an internal collision. The present disclosure is configured to allow contending for channel access for transmitting RTA packets before the RTA packets arrive.

4. Station Embodiments and Topology

4.1. STA Hardware Embodiment

Figure 2:
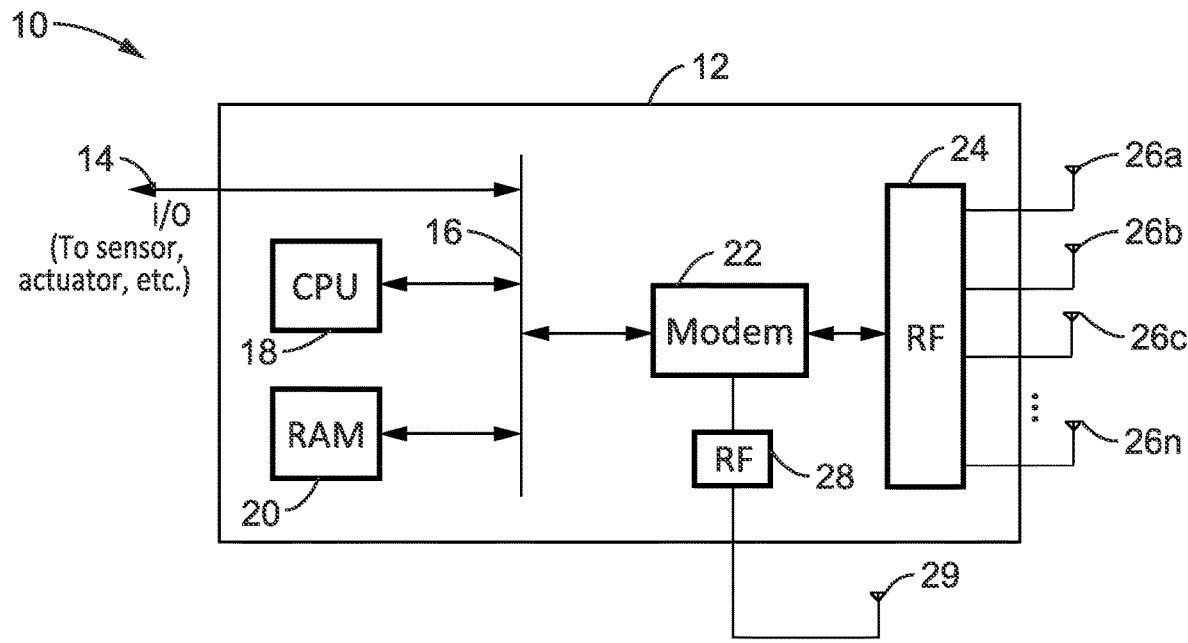
FIG. 2 is a hardware block diagram of wireless station hardware according to at least one embodiment of the present disclosure.

FIG. 2 illustrates an example embodiment 10 of a WLAN station having external I/O 14 into bus 16 of station circuitry 12 having a CPU 18 and RAM 20 for executing a program(s) which implements the wireless network communication protocol, as well as for storing data. The host machine 12 accommodates at least one modem 22 to support communications coupled to at least one RF module 24, 28 connected to one or more antennas 26a, 26b, 26c through 26n, and 29 for performing communications, such as on the sub-6 GHz band (e.g., 2.4, 5, 6 Ghz), and/or for communicating over millimeter wavelengths (mmW). In the example shown RF antenna 29 is an omni-directional antenna. By way of example, RF module 24 is shown having multiple antennas to support beamforming for transmission and reception on that band. In this way, the STA can transmit signals using multiple sets of beam patterns. It should be appreciated that although the examples describe sub-6 Ghz communications, that any desired bands can be supported by the teachings of the present disclosure.

Bus 14 allows connecting various devices to the CPU, such as to sensors, actuators and so forth. Instructions from memory 20 are executed on processor 18 to execute a program which implements the communication protocol, which is executed to allow the STA to perform the functions of an access point (AP) station or a non-AP (regular) station (STA). It should also be appreciated that the programming is configured to operate in different modes (source, transmitter, intermediate, destination, receiver, first AP, other AP, non-AP stations associated with the first AP, stations associated with other AP, coordinator, coordinatee and so forth), depending on what role it is playing in the current communication context.

4.2. Network Topology Example

Figure 3:
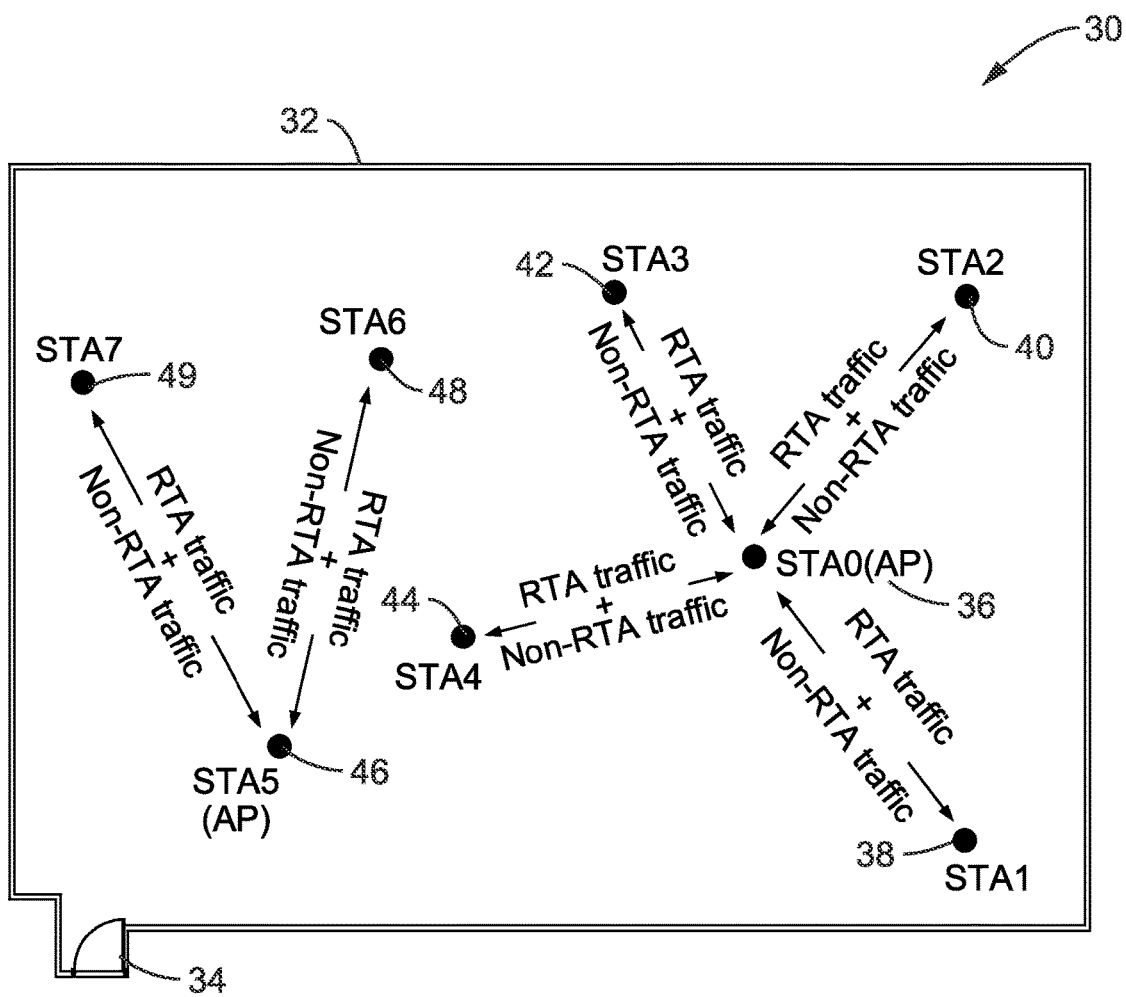
FIG. 3 is a network topology diagram shown by way of example and not limitation as a multiple Basic Service Set (BSS) scenario, each BSS having one Access Point (AP) and multiple stations (STAs), according to at least one embodiment of the present disclosure.

FIG. 3 illustrates a network scenario (topology) 30, which is utilized by way of example and not limitation in the following operational discussions of the present disclosure. This scenario provides a topology to aid explanation of the operations described herein, without limiting the use of the teachings herein to any particular network scenario.

In this example scenario is seen an area 32, depicted here as a room (e.g., meeting room), or similar compartment of a structure, or structural interior, which may also have apertures (e.g., doors/windows) 34 which are not pertinent to this description. In this disclosed scenario there is at least one Basic Service Set (BSS) and associated stations (STAs). This particular example shows two BSS. A first BSS is depicted with AP of STA0 36 and associated non-AP STAs STA1 38, STA2 40, STA3 42 and STA4 44. A second BSS is shown with AP of STA5 46 and non-AP STAs of STA6 48 and STA7 49. Each STA can communicate with the other STAs in the same BSS. All STAs can use CSMA/CA for random channel access.

All STAs in this example are considered to execute (run) both applications requiring low latency communication and applications that utilize best effort communication. The data generated from the application requiring low latency communication is called RTA traffic and is packetized as RTA packets at the transmitter STA; while the data generated from the non-time sensitive application is called non-RTA traffic and is packetized as non-RTA packets at the transmitter STA. As a consequence, the transmitter STA is considered to generate both RTA traffic and non-RTA traffic for communication. The location of the STAs and their transmission links are as shown in the figure.

STAs use EDCA to enqueue the RTA packets and non-RTA packets into different transmit queues and to perform channel contention for each transmit queue. STAs add one or more transmit queues in EDCA to enqueue RTA packets only. RTA packets are enqueued to the transmit queues for RTA packets only while the non-RTA packets are enqueued to original transmit queues in EDCA.

5. RTA Traffic Classification

5.1. RTA Information Elements

FIG. 4 illustrates an example embodiment 50 of content in an RTA-Traffic Specification (TSPEC) element. The STA which transmits the RTA-TSPEC element during RTA-TS setup procedure is denoted as a transmitter STA. The RTA-TSPEC element has the following fields.

(a) An Element ID field indicates the type of element, herein exemplified as an RTA-TSPEC element.

(b) A Length field indicates the length of the RTA-TSPEC element.

(c) An RTA-TS Info field contains traffic stream information as shown in FIG. 5.

(d) A Nominal MSDU Size field, as it defined in the TSPEC element in IEEE 802.11, can be set by an AP or non-AP STA to indicate the nominal size of MSDUs or A-MSDUs belonging to the traffic stream (TS) under this RTA-TSPEC. When an AP receives this field, it could use this field to schedule transmissions to satisfy the QoS requirement of this RTA-TS. By way of example and not limitation, the nominal number of MSDUs or A-MSDUs belonging to the TS under this RTA-TSPEC generated per second can be calculated by Mean Data rate divided by nominal MSDU size; which can be utilized to determine the average overhead (e.g., PLCP preamble, MAC header) that is needed to transmit those MSDUs or A-MSDUs and estimate the total transmission time for that overhead.

(e) A Maximum MSDU Size field, as it defined in the TSPEC element in IEEE 802.11, can be set by an AP or non-AP STA to indicate the maximum size of MSDUs or A-MSDUs belonging to the TS under this RTA-TSPEC. When an AP receives this field, it can utilize the field to schedule transmissions to satisfy the QoS requirement of this TS. By way of example and not limitation, the minimum number of MSDUs or A-MSDUs belonging to the TS under this RTA-TSPEC generated per second can be determined from Minimum Data rate divided by maximum MSDU size; which can be utilized to calculate the minimum overhead (e.g., PLCP preamble, MAC header) that is needed to transmit those MSDUs or A-MSDUs and estimate the total transmission time for that overhead.

(f) A Minimum MSDU Size field can be set by an AP or non-AP STA to indicate the minimum size of MSDUs or A-MSDUs belonging to the TS under this RTA-TSPEC. When an AP receives this field, it can use this field to schedule transmissions to satisfy the QoS requirement of this TS. By way of example and not limitation the maximum number of MSDUs or A-MSDUs belonging to the TS under this RTA-TSPEC generated per second can be determined using Maximum Data rate divided by minimum MSDU size; which can be utilized to calculate the maximum overhead (e.g., PLCP preamble, MAC header) that is needed to transmit those MSDUs or A-MSDUs and estimate the total transmission time for those overheads.

(g) A Minimum Data Rate field, as it defined in the TSPEC element in IEEE 802.11, that can be set by an AP or non-AP STA to indicate the lowest data rate specified by MAC Service Access Point (SAP) for transmitting MSDUs or A-MSDUs belonging to the RTA-TS under this RTA-TSPEC. When an AP receives this field, it can use its information to schedule transmissions to satisfy the QoS requirement of this TS. By way of example and not limitation the minimum amount of data that needs to be transmitted every nominal service interval is given by (Minimum Data Rate*nominal service interval). The minimum transmission time should be arranged by a STA to transmit the minimum amount of data during each nominal service interval.

(h) A Mean Data Rate field, as it is defined in the TSPEC element in IEEE 802.11, can be set by the AP or non-AP STA to indicate the average data rate specified by the MAC Service Access Point (SAP) for transmitting MSDUs or A-MSDUs belonging to the TS under this RTA-TSPEC. When an AP receives this field, it can use this information for scheduling transmissions to satisfy the QoS requirement of the RTA-TS. By way of example and not limitation the STA should ensure that it has sufficient available channel resource (e.g., bandwidth) to transmit the data generated at the mean data rate. Stated another way, the available bandwidth should be greater than the mean data rate.

(i) A Peak Data Rate field, as it defined in the TSPEC element in IEEE 802.11, can be set by an AP or non-AP STA to indicate the maximum data rate specified by the MAC SAP for transmitting MSDUs or A-MSDUs belonging to the RTA-TS under this RTA-TSPEC. When an AP receives this field, it can use the information from this field to schedule transmissions for satisfying the QoS requirement of this TS. By way of example and not limitation the maximum amount of data that needs to be transmitted every nominal service interval is (Peak Data Rate*nominal service interval). The transmission time arranged by the STA to transmit the packets belonging to the TS should be less than the time to transmit the maximum amount of data during each nominal service interval.

(j) A Burst Size field, as it defined in the TSPEC element in IEEE 802.11, can be set by an AP or non-AP STA to indicate the maximum burst time that the MSDUs or A-MSDUs belonging to the RTA-TS under this RTA-TSPEC will be continuously generated at the peak data rate. When an AP receives this field, it can use the information from this field to schedule transmissions for satisfying the QoS requirement of this RTA-TS. By way of example and not limitation the current service interval will be shorter when the burst occurs. However, the service interval won't be shorter, such as by more than a value given (peak data rate/minimum data rate−1)*maximum burst size.

(k) A Service Start Time field, as it defined in the TSPEC element in IEEE 802.11, can be set by an AP or non-AP STA to indicate the start time of the first service period (SP). When an AP receives this field, it can use the information from this field to schedule transmissions for satisfying the QoS requirement of this TS. By way of example and not limitation a STA can know when another STA starts to generate the data belonging to the TS under this RTA-TSPEC, because the first service period (SP) should start at a service interval after the Service Start Time.

(l) A Service End Time field can be set by an AP or non-AP STA to indicate the time of deleting an TS. When an AP receives this field, it can utilize the information in this field to schedule transmissions to satisfy the QoS requirement of this TS. By way of example and not limitation, a STA can determine when the other STA stops generating the data belonging to the TS under this RTA-TSPEC, because there will be no more service periods after the Service End Time.

(m) An Inactivity Interval field, as defined in the TSPEC element in IEEE 802.11, can be set by an AP or non-AP STA to indicate the amount of time allowed without receiving the arrival or transmission of a MSDU belonging to the TS before the TS is deleted. An AP or non-AP STA receiving this field deletes an active TS if no arrival or transmission of a MSDU belonging to the TS takes place within this Inactivity Interval.

(n) An MSDU Lifetime field can be set by an AP or non-AP STA to indicate the lifetime of the MSDUs belonging to the TS under this RTA-TSPEC. If the deterministic service field is set to "1" and a MSDU or A-MSDU is not transmitted successfully within the lifetime which has transpired since it arrived at the MAC layer, then the MSDU or A-MSDU should be dropped. If the traffic is periodic and the STA does not transmit or receive any MSDU or A-MSDU belonging to the TS under this RTA-TSPEC within the MSDU lifetime plus the maximum service interval, then the receiver STA knows that at least one MSDU or A-MSDU is lost. The MSDU Lifetime should be shorter than the Inactivity Interval but longer than the Maximum Service Interval.

(o) A Deterministic Service field indicates whether the TS is generated for an RTA session or not. This field could be as short as a one bit indication, as exemplified. When the TS is generated for an RTA session, then this field is set to a first state, e.g., "1"; otherwise, it is set to a second state e.g., "0".

(p) A Delay Bound field, as defined in the TSPEC element in IEEE 802.11, indicates the maximum time allowed to transmit a MSDU or A-MSDU belonging to the TS under this RTA-TSPEC since the arrival of the MSDU or A-MSDU at MAC. Non-AP sets this field to request the AP to guarantee the latency of the MSDU or A-MSDU belonging to the TS under this RTA-TSPEC. An AP receives this field and estimates whether this request can be satisfied or not. An AP sets this field to indicate the delay bound it can provide. When a non-AP STA receives this field, it either accepts the delay bound provided by the AP or renegotiates with the AP.

(q) A Reliability field indicates the packet loss requirement of the MSDUs or A-MSDUs belonging to the TS under this RTA-TSPEC. A Non-AP sets this field to request the AP to guarantee the packet loss of the MSDU or A-MSDU belonging to the TS under this RTA-TSPEC. An AP receives this field and estimates whether this request can be satisfied or not. An AP sets this field to indicate the packet loss it can provide. When a non-AP receives this field, it either accepts the reliability provided by the AP or renegotiates with the AP.

(r) A Jitter field indicates the jitter requirement for the delivery of the MSDUs or A-MSDUs belonging to the TS under this RTA-TSPEC. A non-AP sets this field to request the AP to guarantee the jitter requirement of the MSDU or A-MSDU belonging to the TS under this RTA-TSPEC. An AP receives this field and estimates whether this request can be satisfied or not. The difference between Maximum service Interval and Minimum service Interval should be less than the jitter value to satisfy this request. The AP sets this field to indicate the jitter requirements it can provide. When a non-AP receives this field, it either accepts the jitter provided by AP or renegotiates with AP.

(s) A Nominal Service Interval field indicates the nominal/average time between the start time of two successive SPs. This field is valid when the Traffic Type subfield in the RTA-TS Info is set to a first state, e.g., "1". A non-AP sets this field to request that the AP guarantee that the service interval of the MSDU or A-MSDU belonging to the TS is under this RTA-TSPEC. An AP that receives this field can estimate whether this request can be satisfied or not. The AP sets this field to indicate the Nominal service interval it can provide. When a non-AP receives this field, it either accepts the jitter provided by AP or renegotiates with the AP.

(t) A Minimum Service Interval field, as it defined in the TSPEC element in IEEE 802.11, is set by an AP to indicate the minimum time between the start times of two successive service periods (SPs). A non-AP that receives this field would expect the time between the start times of two successive SPs to be longer than the Minimum service Interval. This field should of course contain a value corresponding to a time interval which is shorter than that given by the Nominal service interval.

(u) A Maximum Service Interval field, as defined in the TSPEC element in IEEE 802.11, is set by the AP to indicate the maximum time between the start times of two successive SPs. A non-AP which receives this field would expect the time between the start time of two successive SPs to be shorter than the Maximum service Interval. This field should contain an interval value which is larger than the nominal service interval.

(v) A Minimum PHY Rate field, as defined in the TSPEC element in IEEE 802.11, is set by the AP to indicate the lowest PHY rate for transmitting MSDUs or A-MSDUs belonging to the RTA-TS under this RTA-TSPEC. A non-AP receiving this field would not use PHY rate lower than Minimum PHY rate to transmit MSDUs or A-MSDUs belonging to the RTA-TS under this RTA-TSPEC.

(w) A Surplus Bandwidth Allowance field, as defined in the TSPEC element in IEEE 802.11, is set by the AP to indicate the ratio of the bandwidth used for transmitting a MSDU or A-MSDU belonging to the TS under this RTA-TSPEC and its retransmissions to the bandwidth used for a transmitting that MSDU or A-MSDU once at the minimum PHY rate. A non-AP receiving this field may use the extra bandwidth indicated in the field for its retransmissions.

(x) A Medium Time field, as defined in the TSPEC element in IEEE 802.11, is set by an AP to indicate the time that is being admitted for accessing the medium for transmitting MSDUs or A-MSDUs belonging to the TS under this RTA-TSPEC per a nominal service interval. A non-AP receiving this field would use the medium time for the transmission of MSDUs or A-MSDUs belonging to the TS under this RTA-TSPEC per a nominal service interval. This time should guarantee the time for all the MSDUs or A-MSDUs belonging to the TS under this RTA-TSPEC generated per nominal service interval being transmitted at minimum PHY rate.

FIG. 5 illustrates an example embodiment 60 of the RTA-TS information subfield, which was contained in the RTA-TSPEC element seen in FIG. 4. This RTA-TS information field contains traffic stream information having the following subfields.

(a) A Traffic Type subfield is used by the STA which sets this subfield to a first state, e.g., "1", to indicate the traffic is periodic; otherwise, this subfield is set to a second state, e.g., "0", to indicate that the traffic is not periodic. If a STA receives this subfield setting set to the first state, e.g., "1", with RTA-TSPEC element, it can use the nominal service interval in RTA-TSPEC element to represent the average interval of two successive service periods.

(b) A TSID, as defined in the TS-Info field of the TSPEC element in IEEE 802.11, subfield is used by the STA which sets the ID number to identify the RTA-TS. For example, this field could be set to 0~15 to indicate the TID of the traffic belong to the TS under the RTA-TSPEC element.

(c) A Direction subfield is used by the STA which sets this subfield to indicate whether the direction of data transmission of the RTA-TS is uplink, downlink, direct link or bidirectional link. If a STA receives this subfield, it only needs to measure the link on the indicated direction for TS setup.

(d) An Access Policy subfield is used by a STA which sets this subfield to indicate the method of gaining channel access, such as EDCA or other methods. When a STA receives this subfield, it should follow the access policy to gain channel access for data transmissions of the RTA-TS. It is possible that when the access policy is EDCA, the TSID field can be set to 0~15 to indicate the TID.

(e) An Aggregation subfield indicates if this subfield is valid, which only arises if the schedule field is set to a first state, e.g., "1", and the access policy subfield is set to EDCA, otherwise the field is set to a second state, e.g., "0". This subfield can be as small as a one-bit indication as exemplified, or a larger data structure. If the STA is a non-AP originator of an RTA-TS setup, then it sets this field to a first state, e.g., "1", to request the aggregation schedule, or sets it to a second state, e.g., "0", to not request aggregation schedule; and the receiver STA makes a decision on whether or not to provide this service. If the STA is an AP, it sets this field to a first state, e.g., "1", to provide the aggregation schedule or it sets it to a second state, e.g., "0", to not provide the aggregation schedule and the receiver STA should follow the decision made by the AP.

(f) An APSD subfield provides an indicator, such as a one-bit indication, to show whether the automatic Power Save (PS) delivery is used. When this subfield is set to a first state, e.g., "1", then the automatic PS delivery is utilized for transmitting the MSDU or A-MSDU belonging to the RTA-TS, otherwise it is set to a second state, e.g., "0".

(g) An RTA Priority subfield indicates the RTA priority of the MSDU or A-MSDU belonging to the RTA-TS. The RTA priority can be utilized to compare the importance between RTA packets only. It is different from the user priority defined by IEEE 802.1D. All the RTA packets may share the same IEEE 802.1D user priority.

(h) A TSInfo ACK Policy subfield indicates whether the Acknowledgement (ACK) is required and which form of ACK is to be utilized. For example, in at least one embodiment it can have options, such as selecting normal ACK, no ACK, or Block ACK (BA). The STA sets this subfield to share this information with other STAs.

(i) A Retry Policy subfield indicates how the MSDU or A-MSDU belonging to the RTA-TS will be retransmitted. For example, this field can be implemented as a one-bit indication to show whether the unsolicited retry will be used. The transmitter STA sets this subfield to a first state, e.g., "1", if the unsolicited retry is allowed or otherwise sets it to a second state, e.g., "0". The receiver STA can follow the retry policy.

(j) A Schedule subfield provides an indication, such as a one-bit indication, to show whether the transmission of MSDU or A-MSDU belonging to the RTA-TS is scheduled. The transmitter sets this subfield to a first state, e.g., "1", if the transmission is scheduled, or otherwise sets it to a second state, e.g., "0". The receiver STA is configured to follow the schedule to transmit or receive the MSDU or A-MSDU belonging to the RTA-TS.

When the transmitter STA transmits an RTA-TSPEC element in an ADDRTATS Request frame, it sets the fields in RTA-TSPEC element representing the specification and QoS requirement of the RTA-TS. The transmitter STA is configured to set all the fields in the RTA-TSPEC element except the fields between the Surplus Bandwidth Allowance and Medium Time field. The receiver STA which receives the ADDRTATS Request frame is able to use the parameters of the fields in this element to evaluate whether it has sufficient resources to satisfy the requirement of the RTA-TS. If the requirement can be satisfied, the receiver can accept the RTA-TS setup; otherwise, the receiver STA should reject the RTA-TS setup.

When the transmitter STA transmits an RTA-TSPEC element in an ADDRTATS Response frame and the RTA-TS setup is accepted, the transmitter STA should set all the fields in the RTA-TSPEC element. The parameters of the fields in the RTA-TSPEC element represent the final parameter setting in the RTA-TSPEC element for the RTA-TS between the originator STA and receipt STA.

When the transmitter STA transmits this element in the ADDRTATS Response frame and the RTA-TS setup is rejected with suggested changes, the transmitter STA in at least one embodiment sets all the fields in the RTA-TSPEC element except the fields between the Surplus Bandwidth Allowance and Medium Time fields. The parameters of the fields in the RTA-TSPEC element represent the suggested parameter setting in RTA-TSPEC element of the RTA-TS. The receiver STA can use the suggested RTA-TSPEC element to request another RTA-TS setup.

When the transmitter STA transmits the RTA-TSPEC element in ADDRTATS Reserve Request frame, the parameters of the fields in the RTA-TSPEC element represent the specification and requirement of the RTA-TS requested from the upper layer. The receiver STA should continue the RTA-TS setup procedure and set the same parameters of RTA-TSPEC element in its ADDRTATS Request frame.

It should be appreciated that other data structures may be utilized for conveying information necessary for discerning RTA traffic from non-RTA traffic, as well as the other functions described above, without departing from the teachings of the present disclosure.

5.1.2. Example of using RTA Traffic Classification

Figure 6:
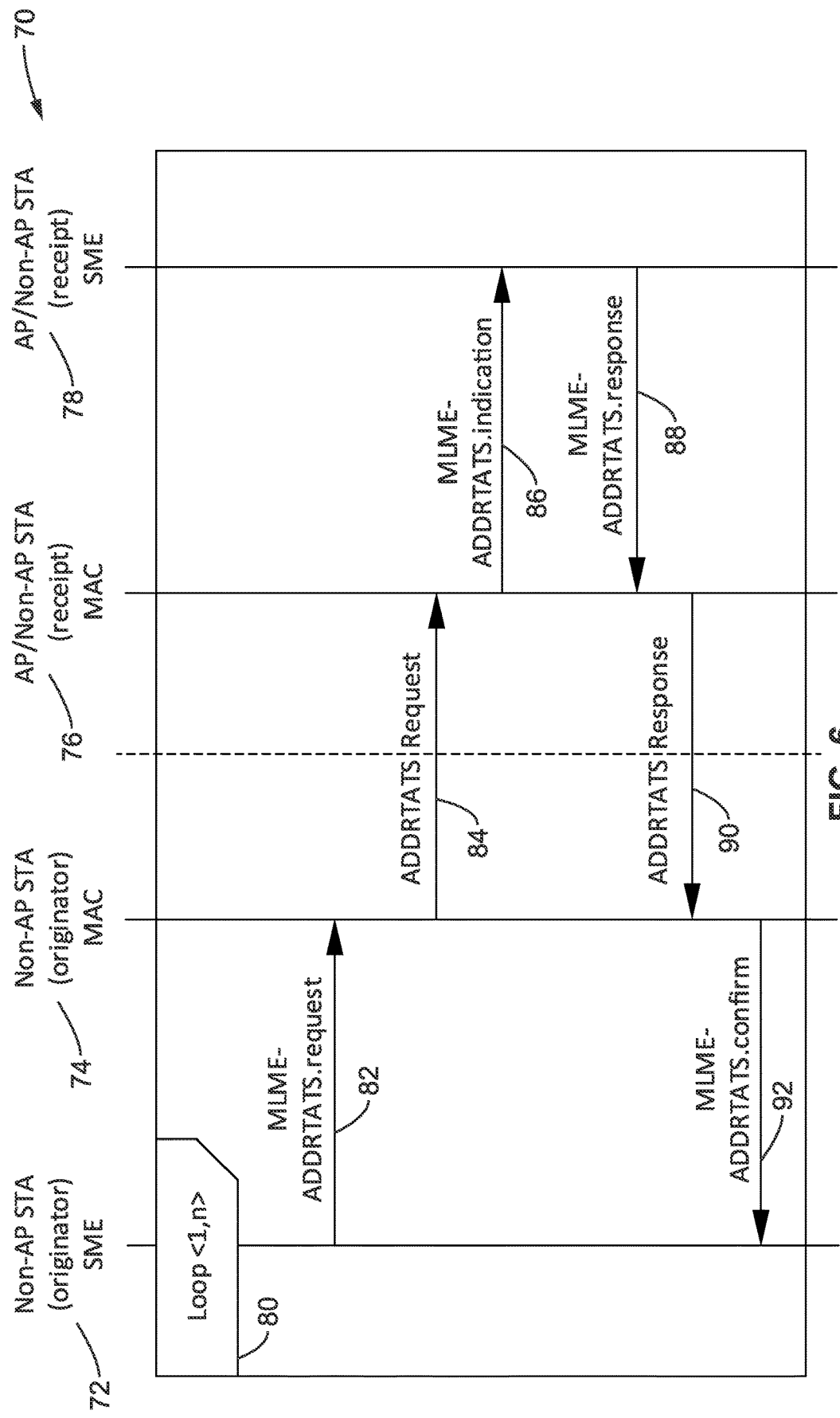
FIG. 6 is a communication sequence diagram between System Management Entity (SME) and Medium Access Control (MAC) layers in a non-AP station and those same layers within an AP station as performed according to at least one embodiment of the present disclosure.

FIG. 6 illustrates an example embodiment 70 of message exchange utilizing RTA traffic classification. The RTA traffic can be classified during the setup of an RTA Traffic Stream (RTA-TS). The figure shows an example of the message exchange between two STAs when the originator non-AP STA initiates an RTA Traffic Stream (RTA-TS) setup procedure with the receiving STA. RTA-TS setup procedure could be the same as TS setup in IEEE 802.11 except that RTA-TS uses RTA-TSPEC element during the procedure while TS uses TSPEC element. RTA-TS could be regarded as a special TS for RTA traffic.

(1) The originator STA, which is exemplified but not limited to being a non-AP STA, decides to initiate an RTA-TS setup procedure with the recipient STA, which in this case is exemplified as an AP or non-AP STA. The SME 72 of the originator STA, performing loop 80, sends an MLME-ADDRTATS.request message 82 to its MAC 74. When the MAC of the originator STA receives the MLME-ADDRTATS.request message, it collects the information in the MLME-ADDRTATS.request message and sends an ADDRTATS request frame 84 to the MAC 76 of the recipient STA. The MAC of the recipient STA receives the frame and generates a MLME-ADDRTATS.indication message 86 to its SME 78.

(2) Then, the SME of the recipient STA sends an MLME-ADDRTATS.response message 88 containing RTA-TS setup result to its MAC 76. Then, the MAC of the recipient STA sends an ADDRTATS response frame 90 to the MAC of the originator STA. The MAC of the originator STA receives the frame and sends an MLME-ADDRTATS.confirm message 92 to its SME 72. Then, the originator then knows whether the RTA-TS setup is successful or not.

(3) If the RTA-TS setup fails, the originator STA could receive the suggested parameters of the RTA-TSPEC element from the ADDRTATS response frame. The originator STA could repeat the procedure as explained in Step 1 and 2 to renegotiate the RTA-TS setup. This loop can occur multiple times. If RTA-TS setup fails with no suggested parameters of the RTA-TSPEC element from the ADDR-TATS response frame, then the TS setup fails with no more negotiation allowed.

(4) The messages used in the RTA-TS setup procedure could be the same as those in TS setup except that the TSPEC element is replaced by RTA-TSPEC element.

When the RTA-TS is setup, the traffic can be classified by matching the TCLAS information of the RTA-TS. When the traffic belongs to an RTA-TS, it is RTA traffic. The user priority of the RTA traffic can be indicated by the RTA-TS which the traffic belongs to. When a RTA-TS is setup, the user priority of RTA traffic can be set in the UP field of TCLAS element in ADDRTATS request/response frame. Otherwise, the traffic is non-RTA traffic.

6. Reference Model

Figure 7:
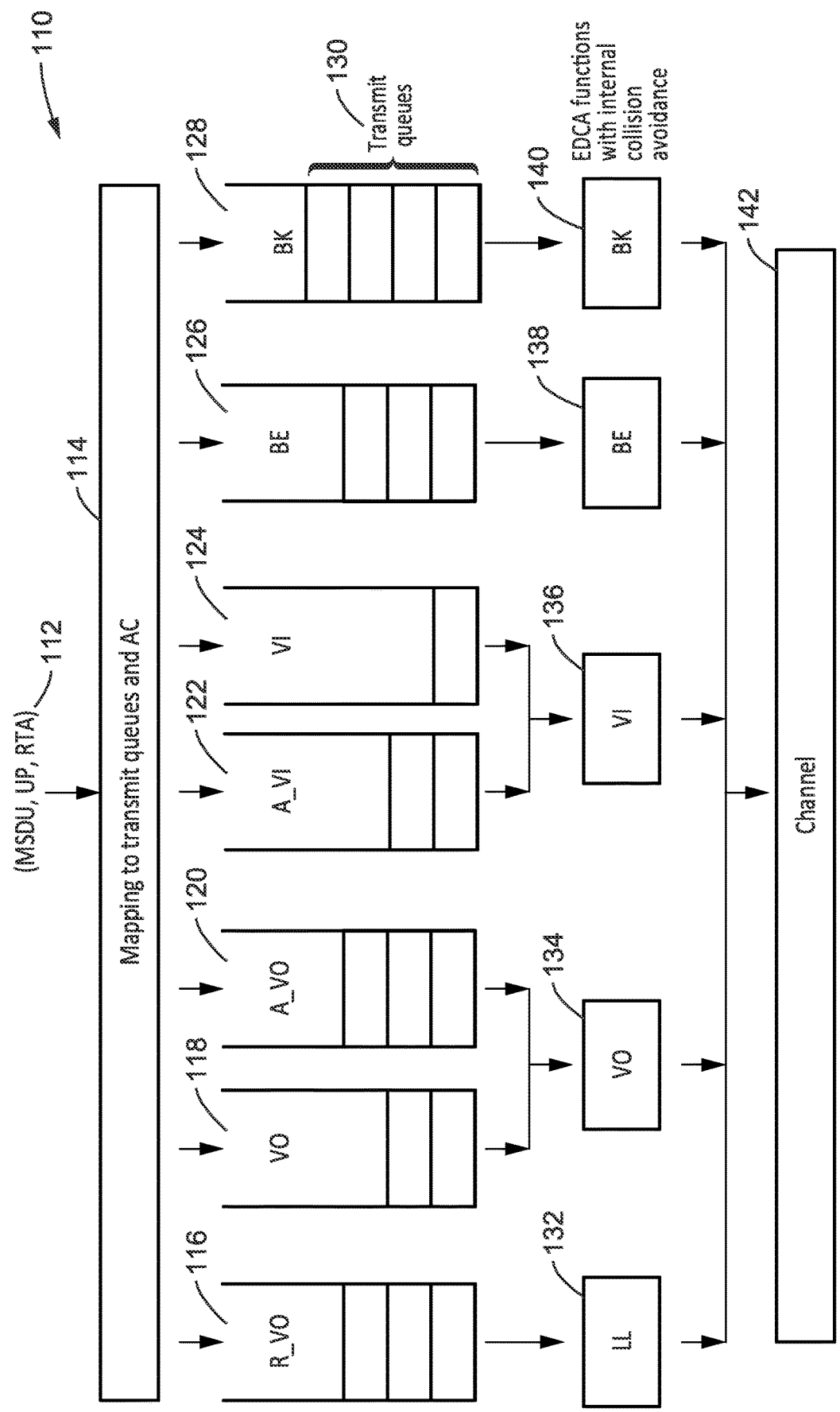
FIG. 7 is a queue flow diagram for an enhanced (augmented) EDCA queue system according to at least one embodiment of the present disclosure.

FIG. 7 illustrates an example embodiment 110 of a reference model of an RTA enhanced EDCA queue system. The queue system receives a MSDU including its UP and RTA (e.g., an indication to indicate whether the MSDU is RTA packet or not) information 112 to a mapping function 114 for transmit queues and access categories and consists of seven transmit queues in five access categories (ACs) which each have an EDCA function (EDCAF) 132, 134, 136, 138 and 140 for accessing channel 142.

The seven transmit queues are RTA voice (R_VO) 116, voice (VO) 118, alternate voice (A_VO) 120, alternate video (A_VI) 122, video (VI) 124, best effort (BE) 126, and background (BK) 128. Each transmit queue decides the transmission order of the packets in its queue.

The five ACs are low latency (LL), voice (VO), video (VI), best effort (BE), and background (BK). Each ACs has an EDCA function (EDCAF) to provide the function of channel contention.

When RTA and non-RTA traffic (i.e., MSDU as shown in the figure) arrive, traffic is mapped to a transmit queue based on the user priority (UP) and the RTA information (e.g., an indication to indicate whether the traffic is RTA or not). The enhanced EDCA queue system can use the traffic-to-AC mapping Option 1 or Option 2 as listed Table 2 and Table 3, respectively.

The R_VO transmit queue uses LL EDCAF to gain channel access as explained in FIG. 8A and FIG. 8B as described below. The VO and A_VO transmit queues use VO EDCAF to gain channel access. The VI transmit queue uses VI EDCAF to gain channel access. The VO and A_VO transmit queues use VO EDCAF to gain channel access. The BE transmit queue uses BE EDCAF to gain channel access. The BK transmit queue uses BK EDCAF to gain channel access.

EDCAFs may gain channel access at the same time, and an internal collision occurs. There is an internal collision avoidance mechanism to avoid the interval collisions between the EDCAFs as explained later in FIG. 9.

6.1. Traffic-to-AC Mapping (Option 1)

Table 2 lists Option 1 of the traffic-to-AC mapping. Let us assume that all the RTA traffic is labeled as UP 6 only. When the traffic with UP 6 is RTA, then the traffic is enqueued in R_VO transmit queue and use LL EDCAF for channel contention. For example, the traffic belonging to an RTA-SP with user priority indicated in the TCLAS element is 6 and using EDCA channel access can be enqueued to the R_VO transmit queue. The non-RTA traffic uses the same Traffic-to-AC mapping as defined in IEEE 802.11 protocol.

As shown in the table, the RTA traffic has higher priority than voice (VO) traffic designated in IEEE 802.1D and has lower priority than network control (NC) traffic designated in IEEE 802.1D.

6.2. UP and RTA-to-AC Mapping (Option 2)

Table 3 lists Option 2 of the traffic-to-AC mapping. Let us assume that the RTA traffic can be labeled as any UP. When the traffic is RTA, then the traffic is enqueued in R_VO transmit queue and uses LL EDCAF for channel contention. For example, the traffic belonging to a RTA-TS using EDCA channel access is enqueued in R_VO transmit queue. The non-RTA traffic uses the same Traffic-to-AC mapping as defined in IEEE 802.11 protocol. As shown in the table, the RTA traffic has higher priority than voice (VO) traffic designated in IEEE 802.1D and has lower priority than network control (NC) traffic designated in IEEE 802.1D. The UP of the RTA traffic could be used as the internal access category priority.

6.3. Low Latency EDCAF

Low Latency EDCA function (LL EDCAF) is the function of channel contention for the packets in R_VO transmit queue. CW[LL] is denoted as the contention window size of LL EDCAF. CWmin[LL] is denoted as the minimum contention window size of LL EDCAF. CWmax[LL] is denoted as the maximum contention window size of LL EDCAF. In at least one or more embodiments the size of CWmin[LL] and CWmax[LL] can be made the same as the minimum and maximum contention window sizes of VO EDCAF, respectively.

Figure 8A:
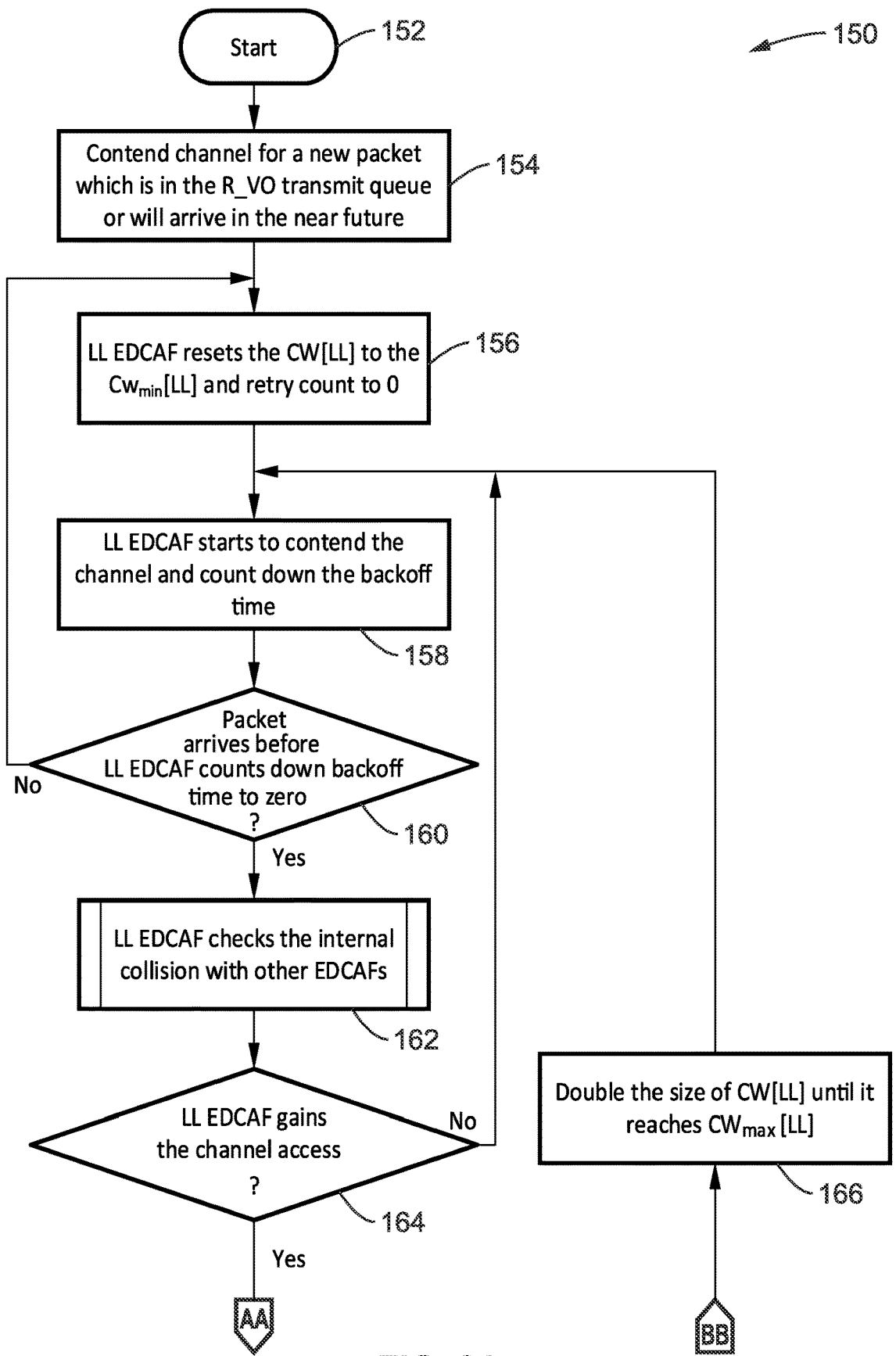
FIG. 8A and FIG. 8B are a flow diagram of performing Low Latency (LL) EDCA function (LL EDCAF) according to at least one embodiment of the present disclosure.
Figure 8B:
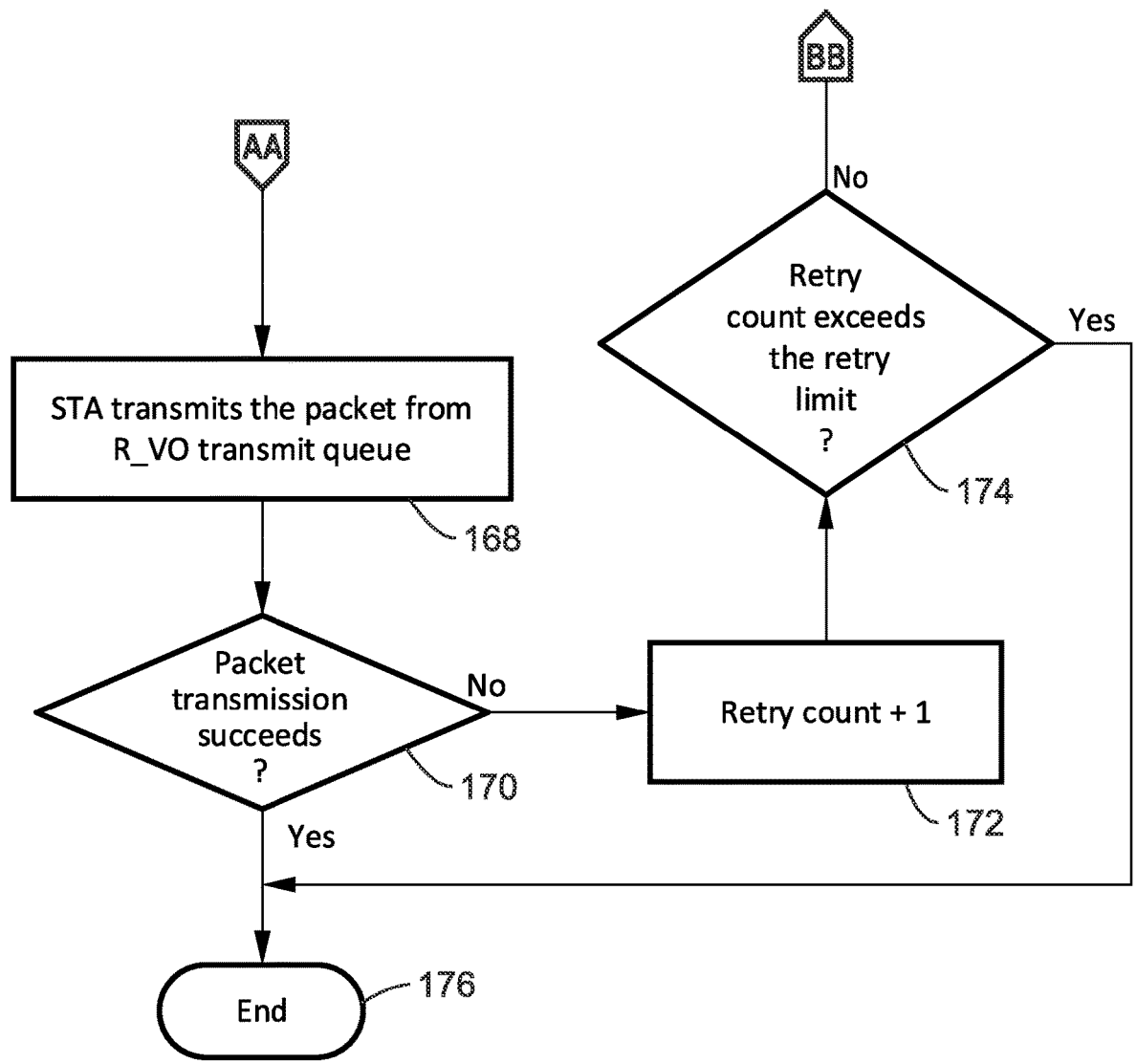

FIG. 8A and FIG. 8B illustrate an example embodiment 150 of performing an LL EDCAF channel contention to transmit a packet from the LL transmit queue. The process starts 152 in FIG. 8A. When LL EDCAF contends 154 for the channel to transmit a new packet which is in the R_VO transmit queue, or will arrive in the near future, it resets 156 the CW[LL] to the CWmin[LL] and the retry count is reset to 0. It should be noted that when LL EDCAF contends for the channel in the case of a packet which has not yet arrived, the LL queue will be empty at that time. Then, LL EDCAF starts to contend 158 for the channel and counts down the backoff time.

A check is made 160 to determine if the packet arrives before LL EDCAF counts down its backoff to zero. If the packet has not arrived, then in at least one embodiment execution returns to block 156 and LL EDCAF resets its contention window to CWmin[LL] and restarts the backoff. Otherwise, if the packet has arrived before LL EDCAF counts down the backoff time to zero, then execution moves to block 162 with LL EDCAF checking for internal collisions with other EDCAFs. The procedure of internal collision checks was explained in relation to FIG. 3. A check 164 is then made to determine if the LL EDCAF is to gain channel access after LL EDCAF checks for internal collisions with other EDCAFs. If it does not gain channel access, then execution returns to block 158 where the STA is exemplified as restarting the backoff without changing its contention window size. Otherwise, if it gains channel access, then execution moves to block 168 in FIG. 8B with the STA transmitting the packet from the R_VO transmit queue. A check 170 is made to determine if the packet transmission succeeded. If the packet transmission succeeds, then the transmission ends 176. Otherwise, execution is seen moving to block 172 with the STA increasing its retry count for this packet, such as by one. A check 174 is made to determine if the retry count exceeds the retry limit. If the retry limit has been exceeded, then the packet is dropped, with execution moving to the end 176. Otherwise, if the retry limit has not been exceeded, then execution moves to block 166 in FIG. 8A and LL EDCAF doubles the contention window size until it reaches CWmax[LL] and re-contends for the channel back at block 158.

6.4. Internal Collision Avoidance for LL EDCAF

Figure 9:
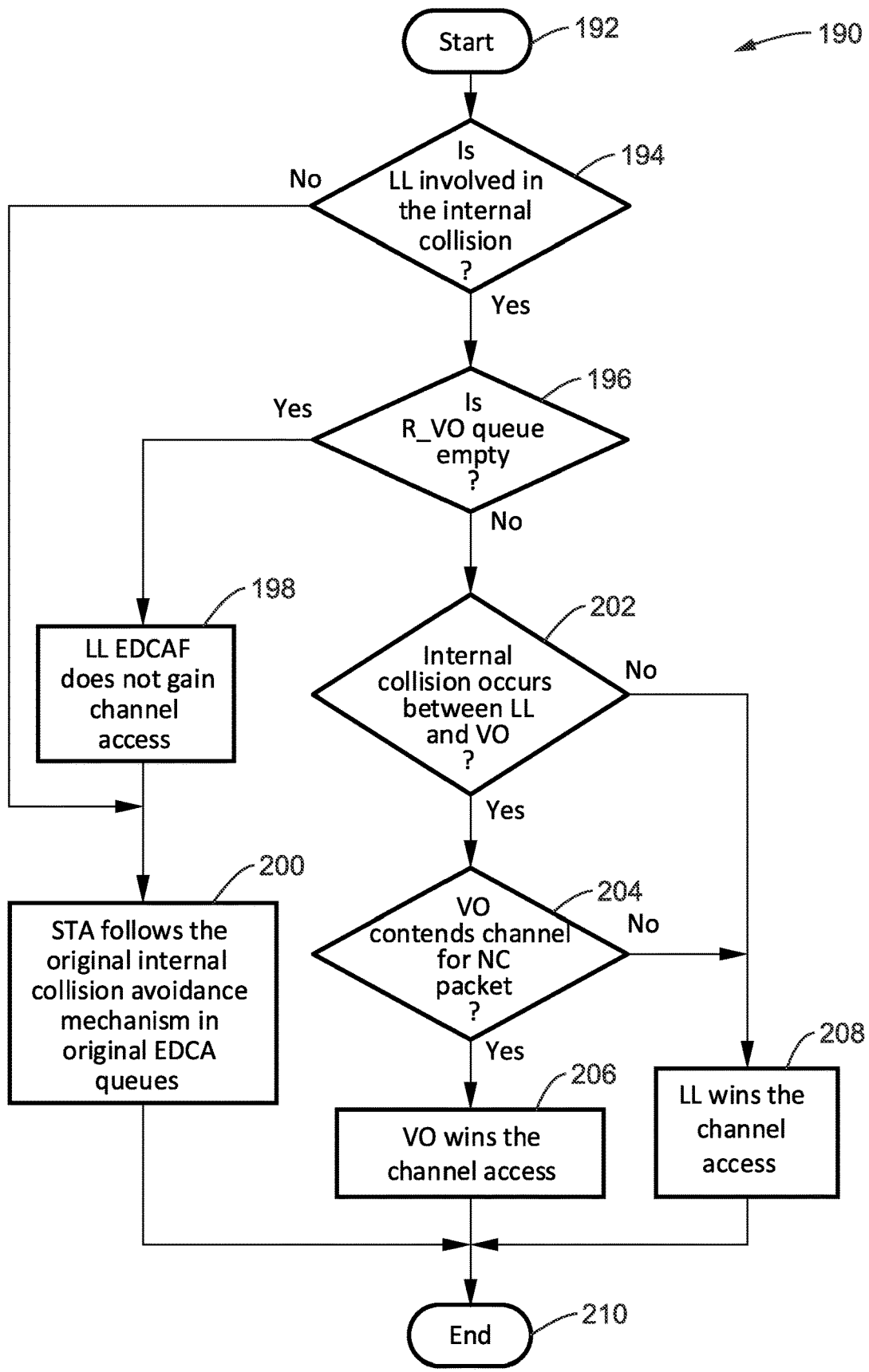
FIG. 9 is a flow diagram of an internal collision avoidance mechanism within the enhanced EDCA queue system according to at least one embodiment of the present disclosure.

FIG. 9 illustrates an example embodiment 190 of an internal collision avoidance mechanism in enhanced EDCA queue system. Execution starts 192 and a check is made 194 to determine if the LL EDCAF is involved in an internal collision. If the STA is not involved in an internal collision then execution is seen moving to block 200 to follow the internal collision avoidance mechanism in the EDCA queue of IEEE 802.11.

If the LL EDCAF is involved in an internal collision in block 194, then a check is made at block 196 to determine if the R_VO queue is empty. If the R_VO transmit queue is empty, then execution moves to block 198 and the LL EDCAF does not gain channel access, and execution moves to block 200 following the original internal collision avoidance mechanism in the EDCA queue of IEEE 802.11.

However, if the LL EDCAF is involved in the internal collision and the R_VO queue is not empty, then execution reaches block 202 which checks if the collision is between the LL and VO. If the collision is not with VO and the R_VO transmit queue is not empty, then block 208 is reached and LL EDCAF gains channel access before the process ends 210.

If at block 202 it is determined that the LL EDCAF is involved in the internal collision with VO EDCAF and the R_VO transmit queue is not empty, then execution reaches block 204 with a check on what type of packet the VO EDCAF is to transmit. If the VO EDCAF is trying to transmit a network control (NC) packet, then execution reaches block 206 and the VO EDCAF gains channel access. Otherwise, if VO is not contending for sending an NC packet, then execution moves to block 208 and the LL EDCAF gains channel access.

6.5. Example of STA Gaining Channel Access for RTA Packet Tx

Figure 10:
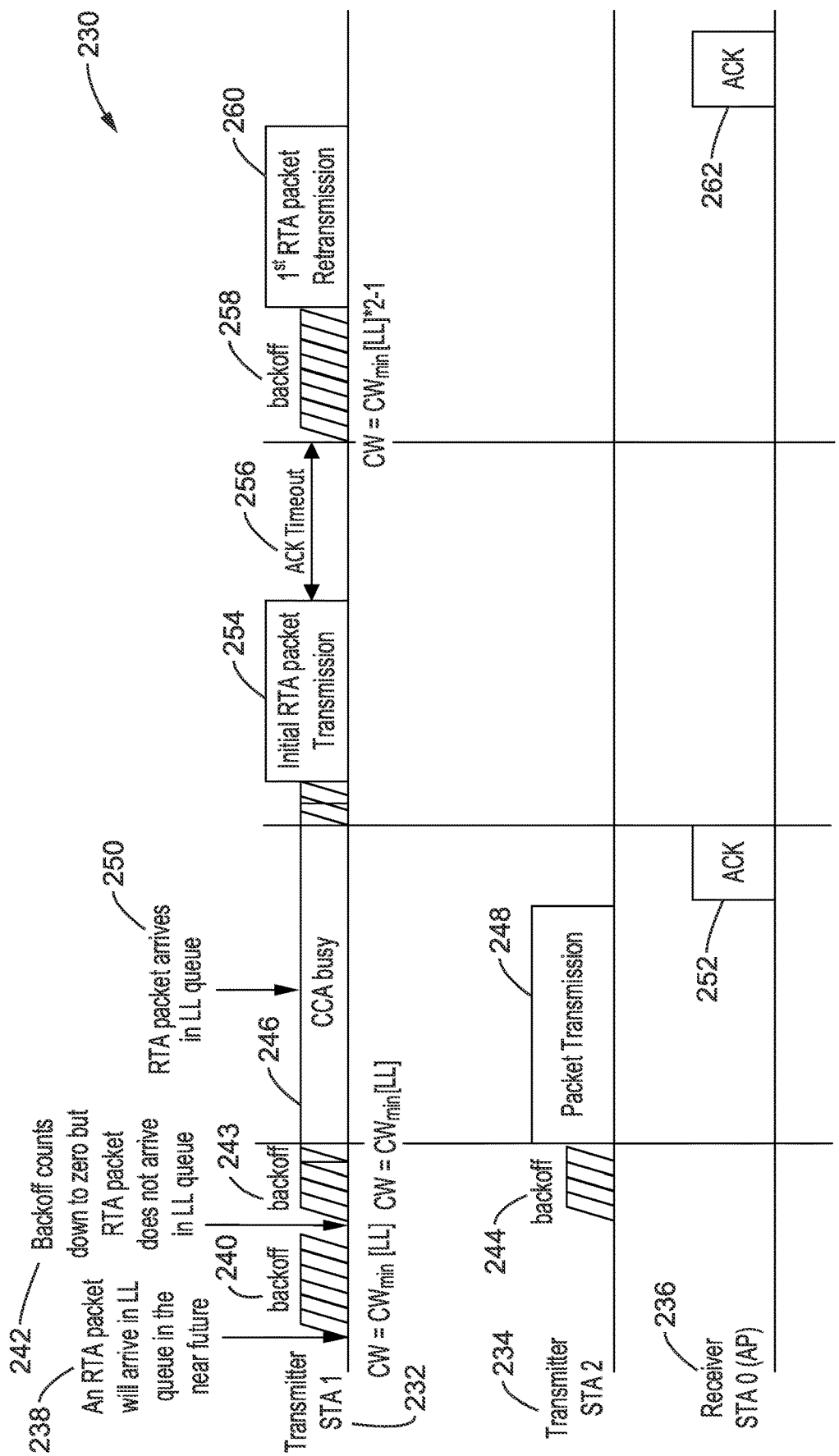
FIG. 10 is a communication sequence diagram showing a case of a STA gaining channel access for RTA packet transmission according to at least one embodiment of the present disclosure.

FIG. 10 illustrates an example embodiment 230 of a STA gaining channel access for an RTA packet transmission. The figure depicts interactions between transmitter STA1 232, transmitter STA2 234 and a receiver STA0 (AP) 236. The transmit queues in STA1 are empty.

Transmitter STA1 has an RTA packet to be transmitted in the near future 238. No other packet arrives at the transmit queues of STA1 until the RTA packet is transmitted successfully. The LL EDCAF starts contending 240 for the channel and counts down the backoff if an RTA packet will arrive in the near future. In this case, the backoff counts down to zero but the RTA packet does not arrive in R_VO transmit queue 242, then STA1 resets the contention window and restarts the backoff 243. The contention window of LL EDCAF does not increase. At this time STA2 is also contending for the channel with a backoff 244.

When STA1 counts down the backoff, the backoff is paused, before the backoff had counted down to zero, when STA1 senses that another STA (e.g., STA2 shown in the figure) is transmitting 248 over the channel, and STA1 CCA indicates busy 246. During the transmission by STA2 the RTA packet arrives 250 for STA1 in the LL transmit queue. After STA2 transmission is complete and receives ACK 252 from the AP, then STA1 backoff gets completed and STA1 gains channel access and transmits the RTA packet transmission 254 for its initial (first) attempt. As shown in the figure, the first attempt fails as the ACK timeout period expires 256 without receiving an ACK from the AP. STA1 doubles its contention window and performs backoff 258, and obtains the channel for retransmission 260 of the RTA packet, and this time receives an ACK 262 from the AP. It should be noted that if STA1 obtains channel access and reserves the TXOP duration, then multiple RTA packets can be transmitted within the TXOP.

6.6. Example of RTA Tx Not Allowed Due to Internal Collision

Figure 11:
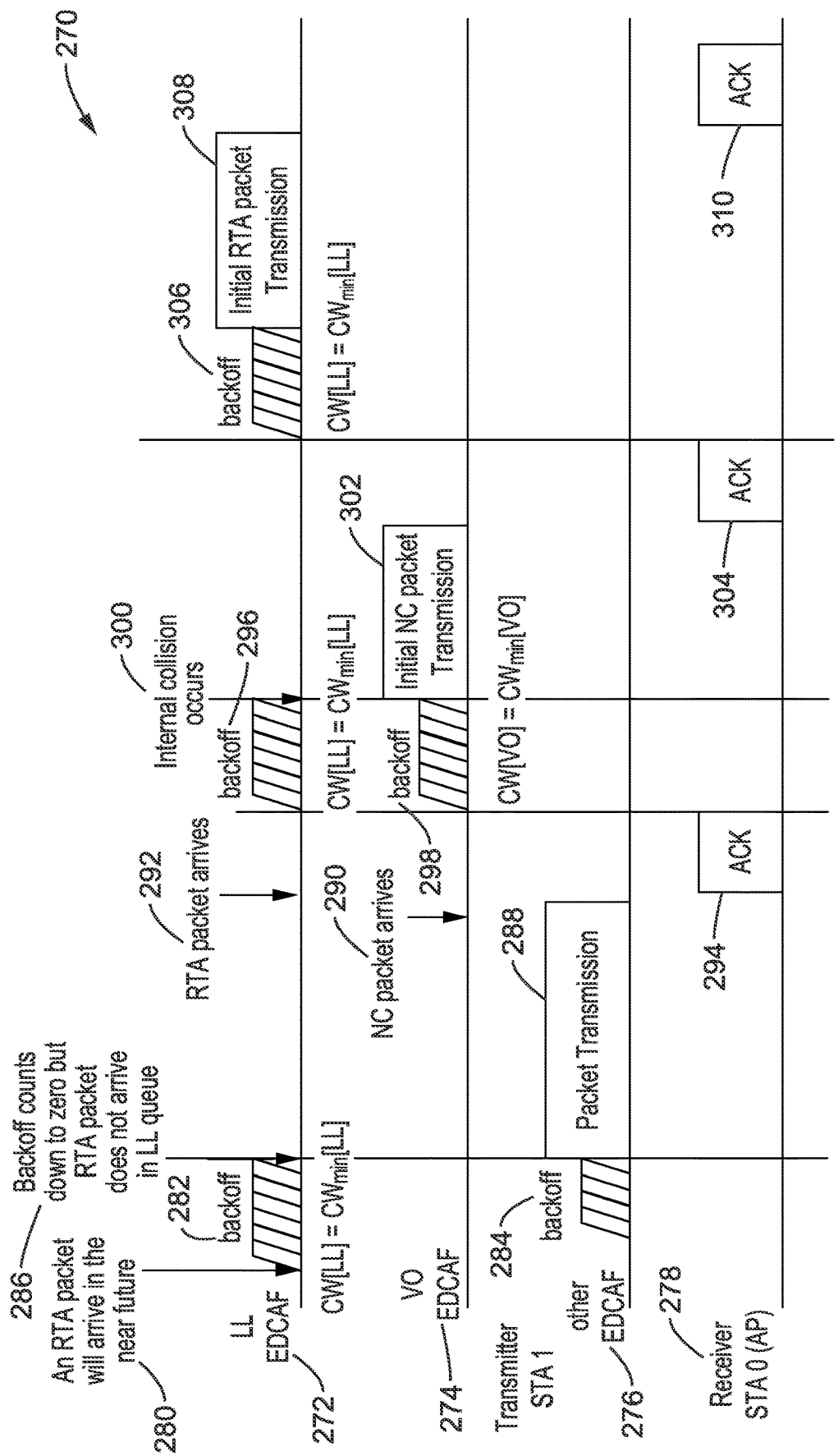
FIG. 11 is a communication sequence diagram showing a case in which an RTA transmission is not allowed to commence due to an internal collision as performed according to at least one embodiment of the present disclosure.

FIG. 11 illustrates an example embodiment 270 of an RTA transmission that is not allowed to commence due to an internal collision. The figure depicts interactions between transmitter STA1 with its LL EDCAF 272, VO EDCAF 274, other EDCAF 276 and a receiver STA0 (AP) 278. It will be noted that the other EDCAF is denoted as an EDCAF other than LL and VI in the enhanced EDCA queue system.

The transmit queues in STA1 are empty. However, an RTA packet is expected to arrive 280 at the LL EDCAF in the near future, so an LL EDCAF backoff is performed 282. When the LL EDCAF and other EDCAF counts down the backoff to zero at the same time, the other EDCAF gains channel access to transmit the packet 288. While at this time the R_VO transmit queue is empty and the RTA packet has not yet arrived. During packet transmission an NC packet arrives 290 for VO EDCAF, and an RTA packet arrives 292 for LL EDCAF. After the transmission in progress completes with the AP returning ACK 294, then both the LL EDCAF and VO EDCAF contend for the channel. So LL EDCAF restarts its backoff 296 with the contention window set to CWmin[LL], and VO EDCAF starts its backoff 298 with the contention window set to CWmin[VO], and an internal collision occurs 300.

When the LL EDCAF and the VO EDCAF count down the backoff to zero at the same time, the VO EDCAF gains channel access to transmit the packet 302 since the packet is a NC packet. After this NC packet transmission is completed with ACK 304 received, then LL EDCAF restarts the backoff 306, and its does not increase its contention window. Thus the RTA packet is transmitted 308 and the AP returns ACK 310. It should be noted that if STA1 obtains channel access and reserves the TXOP duration, multiple RTA packets can be transmitted within the TXOP.

6.7. Example of RTA Tx Allowed Despite Internal Collision

Figure 12:
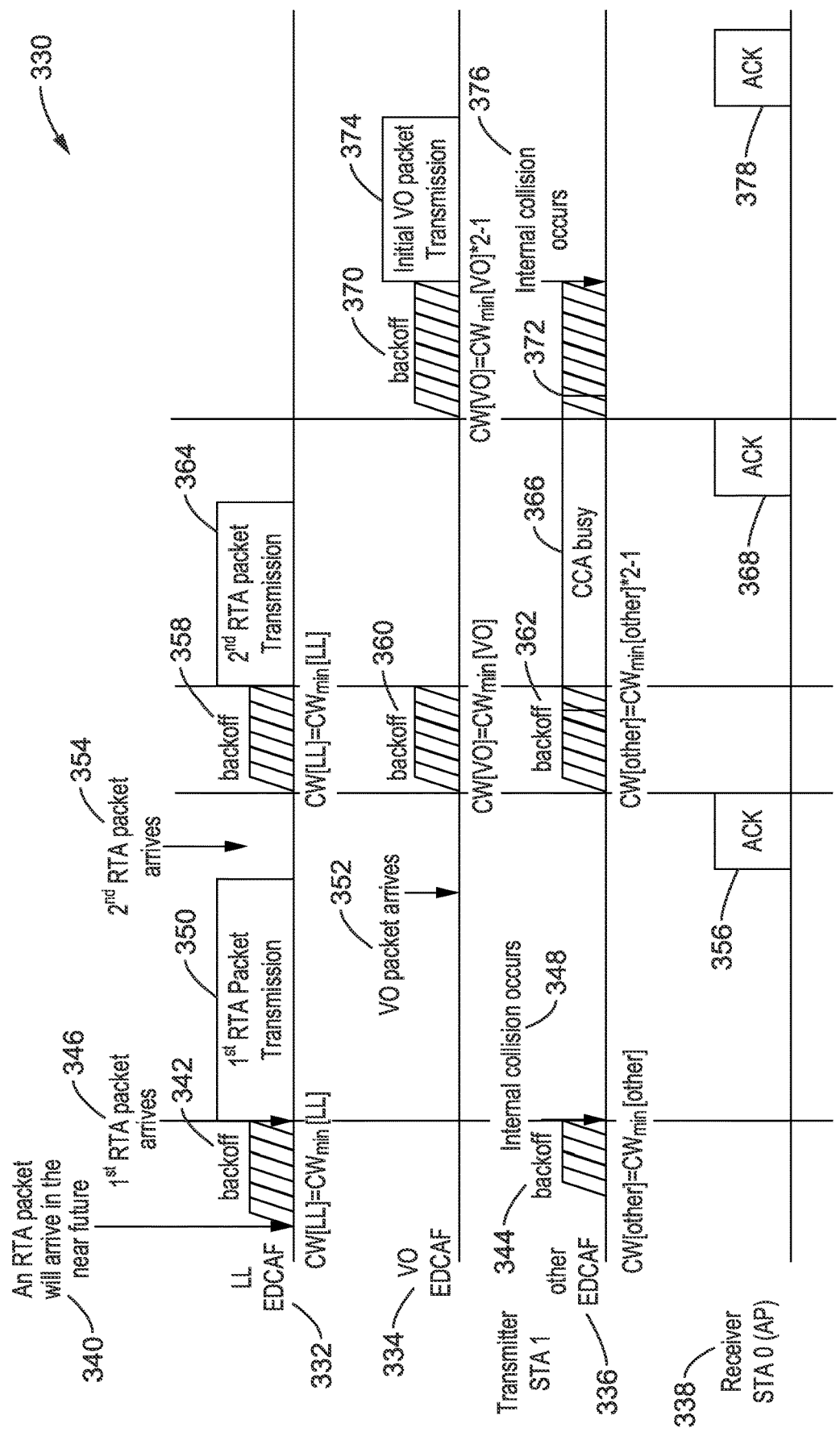
FIG. 12 is a communication sequence diagram showing a case in which RTA transmission is allowed to commence when an internal traffic collision occurs according to at least one embodiment of the present disclosure.

FIG. 12 illustrates an example embodiment 330 of an instance in which RTA transmission is allowed to commence when an internal collision occurs. The figure depicts interactions between transmitter STA1 with its LL EDCAF 332, VO EDCAF 334, other EDCAF 336 and a receiver STA0 (AP) 338. The other EDCAF is denoted as the EDCAF other than LL and VI in the enhanced EDCA queue system. As an RTA packet is expected to arrive in the near future 340, LL EDCAF starts backoff 342, while other EDCAF has a packet and starts a backoff 344.

An internal collision occurs 348 between LL EDCAF and another EDCAF. The LL EDCAF is allowed to commence its transmission 350 if the LL transmit queue is not empty. In the figure a $1^{st}$ RTA packet is seen arriving 346 at or before the collision, so LL EDCAF starts transmission. During the transmission a VO packet arrives 352. After this RTA transmission 350 is completed, seen here as after ACK 356 (or similarly after an ACK timeout interval), then LL, VO and other EDCAF are all contending for the channel, with backoffs 358, 360, 362, respectively.

When an internal collision occurs between LL EDCAF and VO EDCAF, then LL EDCAF is allowed to commence transmission even if the R_VO transmit queue is not empty since VO EDCAF is to transmit a VO packet. So a $2^{nd}$ RTA packet is seen transmitted 364 and completes by receiving ACK 368 from STA0. It will be noted that the STA can transmit the 2nd RTA packet without backoff if the STA reserves TXOP duration for the 2nd RTA packet during the 1st RTA packet transmission. The backoff might be needed if the STA is starting a new TXOP or needs to contend again for any other reasons.

During the $2^{nd}$ RTA packet transmission the other EDCAF finds CCA busy 366. Then VO EDCAF and the other EDCAF contend with backoffs 370, 372, with internal collision occurring 376, and VO EDCAF gains the channel to perform its initial VO packet transmission 374, which is seen completed after ACK 378 is returned.

6.8. EDC Queues for RTA 6.8.1. First Alternative EDCA Queue for RTA

Figure 13:
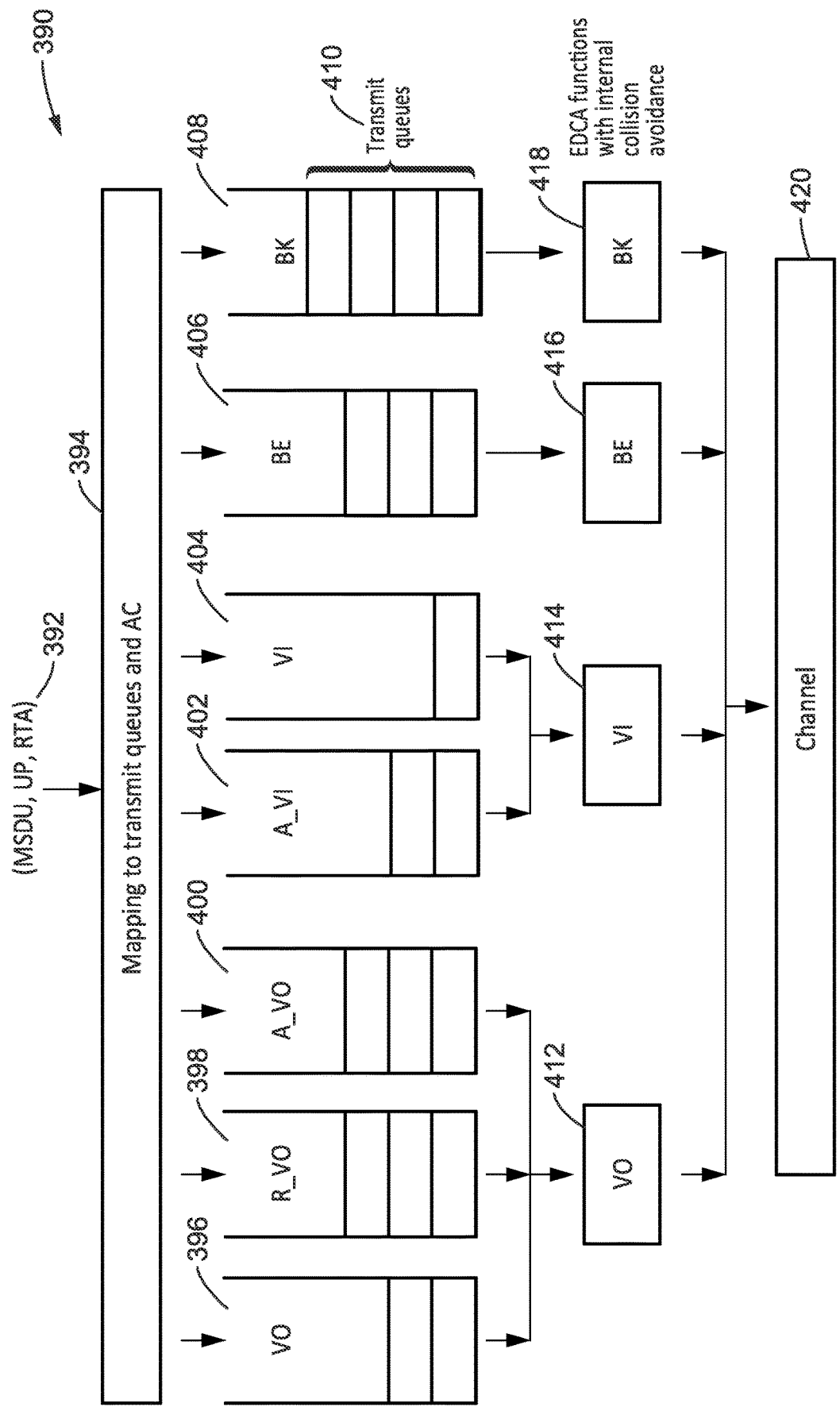
FIG. 13 is a queue flow diagram for a first implementation of an enhanced EDCA queue system supporting low latency RTA packet traffic according to at least one embodiment of the present disclosure.

FIG. 13 illustrates an example embodiment 390 of an alternate RTA enhanced EDCA queue for RTA. Packets come in as MSDU including UP and RTA information 392 to be mapped 394 to transmit queues 410 in different access categories (AC). A new transmit queue R_VO 398 is added in the queue system, with the conventional queues VO 396, A_VO 400, A_VI 402, VI 404, BE 406 and BK 408. It will be seen that the queues are coupled to EDCA functions (EDCAF) with internal collision avoidance. In this case the VO queues are coupled to a VO EDCAF 412, VI queues to a VI EDCAF 414, the BE queue to a BE EDCAF 416, and the BK queue to a BK EDCAF 418; each of these being coupled to the channel 420.

In the present disclosure there is no new EDCAF or AC added in the system. The R_VO transmit queue 398 shares the VO EDCAF 412 with the VO and A_VO transmit queues. This queue system could use the traffic-to-AC mapping of Option 1 or Option 2 as shown in Table 2 or Table 3 to map the traffic to the transmit queue. R_VO has lower priority than A_VO and higher priority than VO. Thus, there is a higher probability that packets in R_VO transmit queue will be transmitted earlier than the packets in the VO transmit queue. There is a higher probability that packets in A_VO transmit queue will be transmitted earlier than the packets in the R_VO transmit queue. The other EDCAFs and their associated transmit queues are identical to the EDCA queue system defined in IEEE 802.11. Since there is no new AC or EDCAF, the process of internal collision avoidance can be performed the same as defined in IEEE 802.11.

It is possible that when the R_VO transmit queue is not empty, the VO EDCAF can contend the channel as LL EDCAF shown in FIG. 8.

6.8.2. Second Alternative EDCA Queue for RTA

Figure 14:
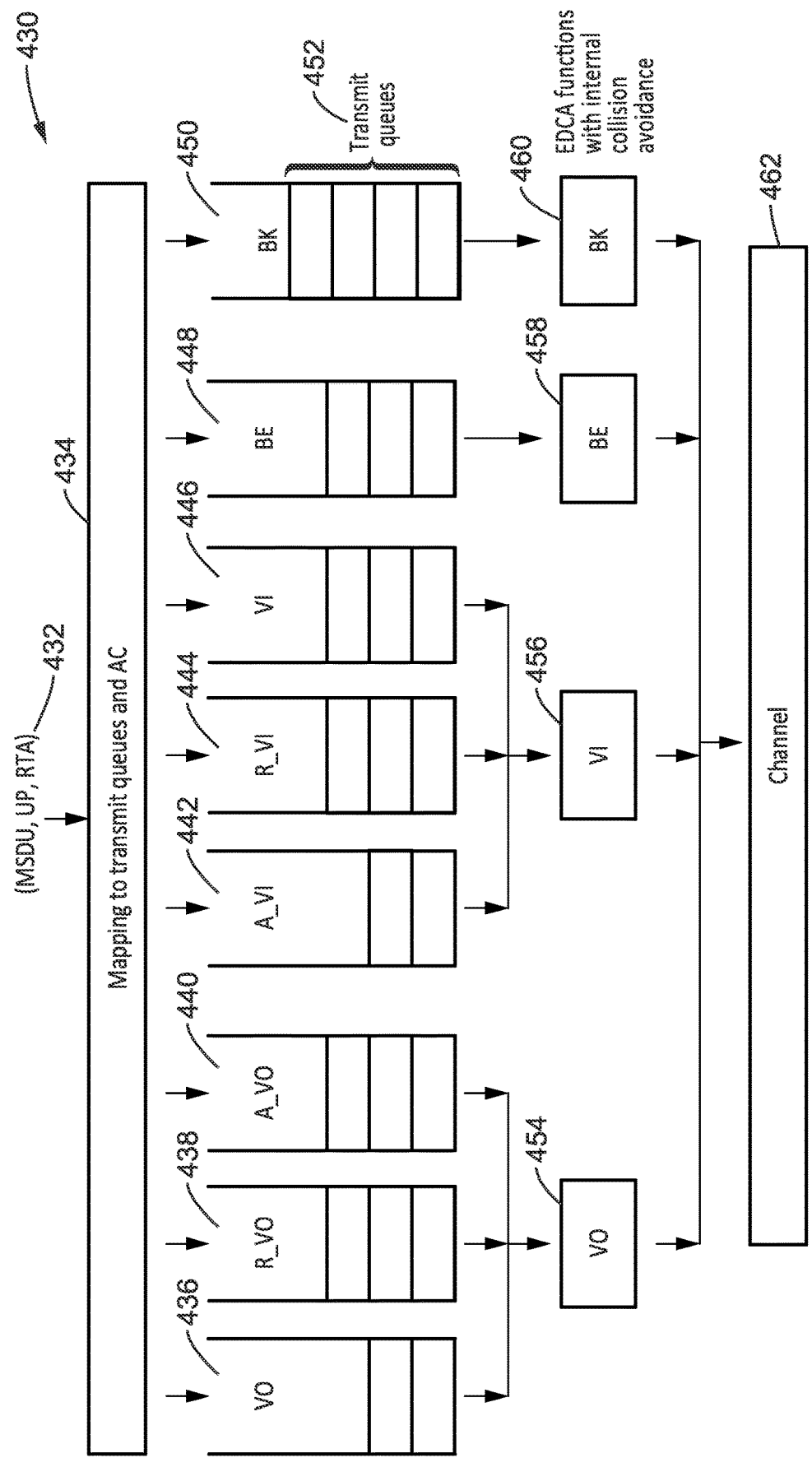
FIG. 14 is a queue flow diagram for a second implementation of an enhanced EDCA queue system supporting low latency RTA packet traffic according to at least one embodiment of the present disclosure.

FIG. 14 illustrates an example embodiment 430 of another alternate EDCA queue for RTA, containing two new transmit queues R_VO 438 and R_VI 444 added into the queue system.

Packets come in as MSDU including UP and RTA information 432 to be mapped 434 to transmit queues 452 in different access categories (AC). The queue system is now seen with VO 436, R_VO 438, A_VO 440, A_VI 442, R_VI

444, VI 446, BE 448 and BK 450. It will be seen that the queues are coupled to EDCA functions (EDCAF) with internal collision avoidance. In this case the VO queues are coupled to a VO EDCAF 454, VI queues to a VI EDCAF 456, the BE queue to a BE EDCAF 458, and the BK queue to a BK EDCAF 460; each of these being coupled to channel 462.

There is no new EDCAF or AC added in the system. The R_VO transmit queue 438 shares the VO EDCAF 454 with VO 436 and A_VO 440 transmit queues. The R_VI transmit queue 444 shares the VI EDCAF 456 with A_VI 442 and VI 446 transmit queues. This queue system could use the traffic-to-AC mapping Option 3 as shown in Table 4. R_VO has lower priority than A_VO and higher priority than VO. Thus, there is a higher probability that the packets in R_VO transmit queue will be transmitted earlier than the packets in the VO transmit queue. Also there is a higher probability that the packets in the A_VO transmit queue will be transmitted earlier than the packets in the R_VO transmit queue.

R_VI has higher priority than A_VI and VI. Thus, there is a higher probability that packets in the R_VI transmit queue will be transmitted earlier than the packets in A_VI and VI transmit queues. The other EDCAFs and their associated transmit queues can be identical to the EDCA queue system defined in IEEE 802.11. Since there is no new AC or EDCAF, the internal collision avoidance process can be the same as defined in IEEE 802.11.

It is possible that when the R_VO transmit queue is not empty, the VO EDCAF can contend the channel as LL EDCAF shown in FIG. 8. It is possible that when the R_VI transmit queue is not empty, the VI EDCAF can contend the channel as LL EDCAF shown in FIG. 8.

6.9. Traffic-to-AC Mapping (option 3)

Table 4 lists Option 3 of the traffic-to-AC mapping. When the traffic with UP 6 is RTA (e.g., the traffic belonging to a RTA-TS with UP 6 and using EDCA channel access), then the traffic is enqueued in R_VO transmit queue. When the traffic with UP 5 is RTA (e.g., the traffic belonging to a RTA-TS with UP 5 and using EDCA channel access), then the traffic is enqueued in R_VI transmit queue. The non-RTA traffic uses the same Traffic-to-AC mapping as defined in IEEE 802.11 protocol. As shown in the table, the RTA traffic with UP 6 has higher priority than voice (VO) traffic designated in IEEE 802.1D and has lower priority than network control (NC) traffic designated in IEEE 802.1D. The RTA traffic with UP 5 has higher priority than video (VI) traffic and controlled load (CL) traffic designated in IEEE 802.1D.

6.10. Transmission Priority between Transmit Queues

Figure 15:
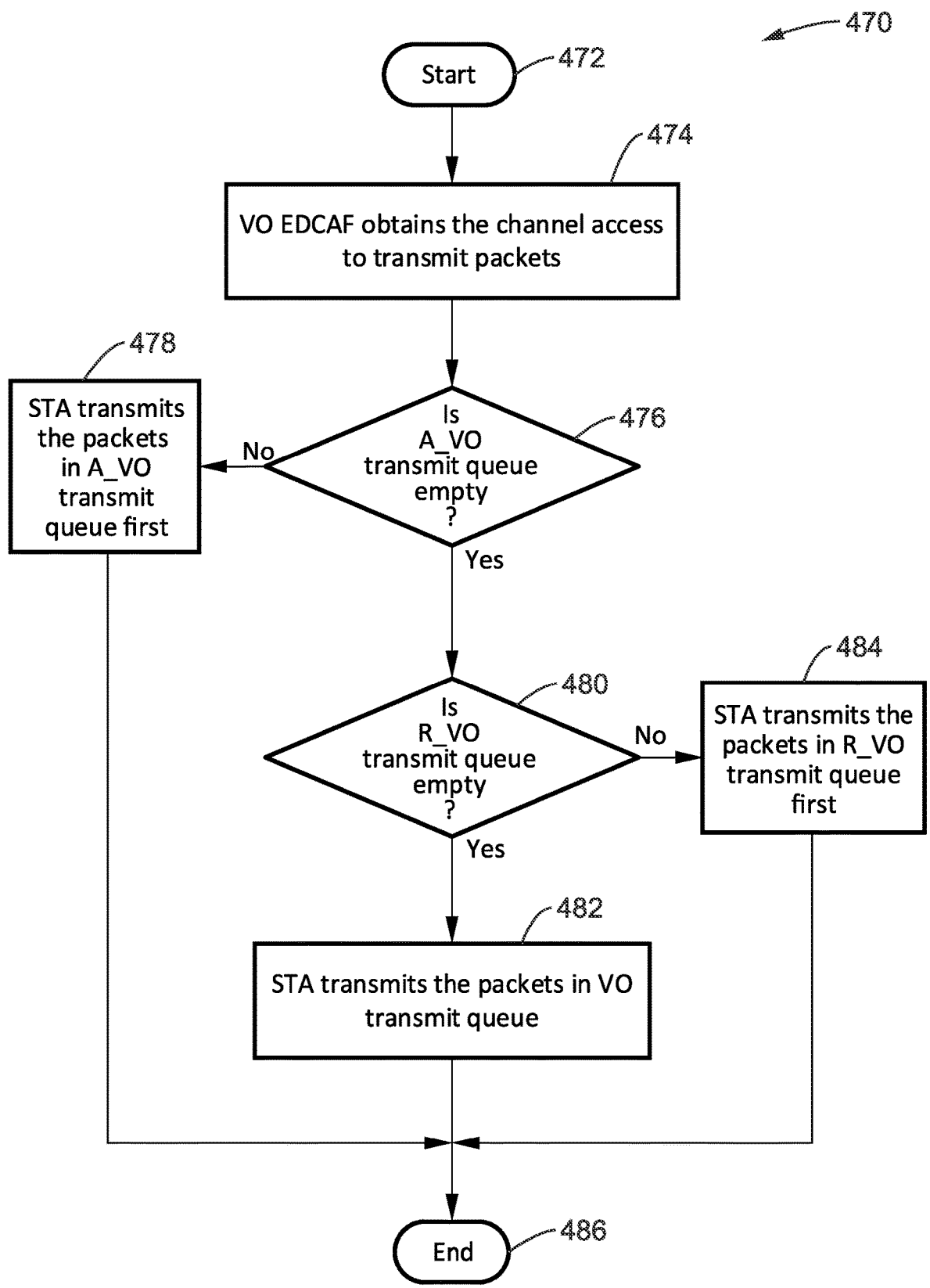
FIG. 15 is a flow diagram of a station determining from which transmit queue in the VO access class that a packet is to be transmitted performed according to at least one embodiment of the present disclosure.

FIG. 15 illustrates an example embodiment 470 of a STA deciding from which transmit queue a packet is to be transmitted. The process starts 472 and the VO EDCAF in the alternate EDCA queue for RTA obtains 474 channel access. A check is made 476 on whether the A_VO queue is empty. If the A_VO transmit queue is not empty, then execution moves to block 478 and the STA transmits the packets in the A_VO transmit queue first, before the process ends 486. Otherwise, if at block 476 the A_VO transmit queue is empty a check is made 480 to determine if the R_VO transmit queue is empty. If the R_VO transmit queue is not empty, then execution moves to block 484 and the STA transmits the packets in the R_VO transmit queue first and processing ends 486. If the A_VO and R_VO transmit queues are both empty, then execution reaches block 482, and the STA transmits the packets in the VO transmit queue first and processing ends 486.

Figure 16:
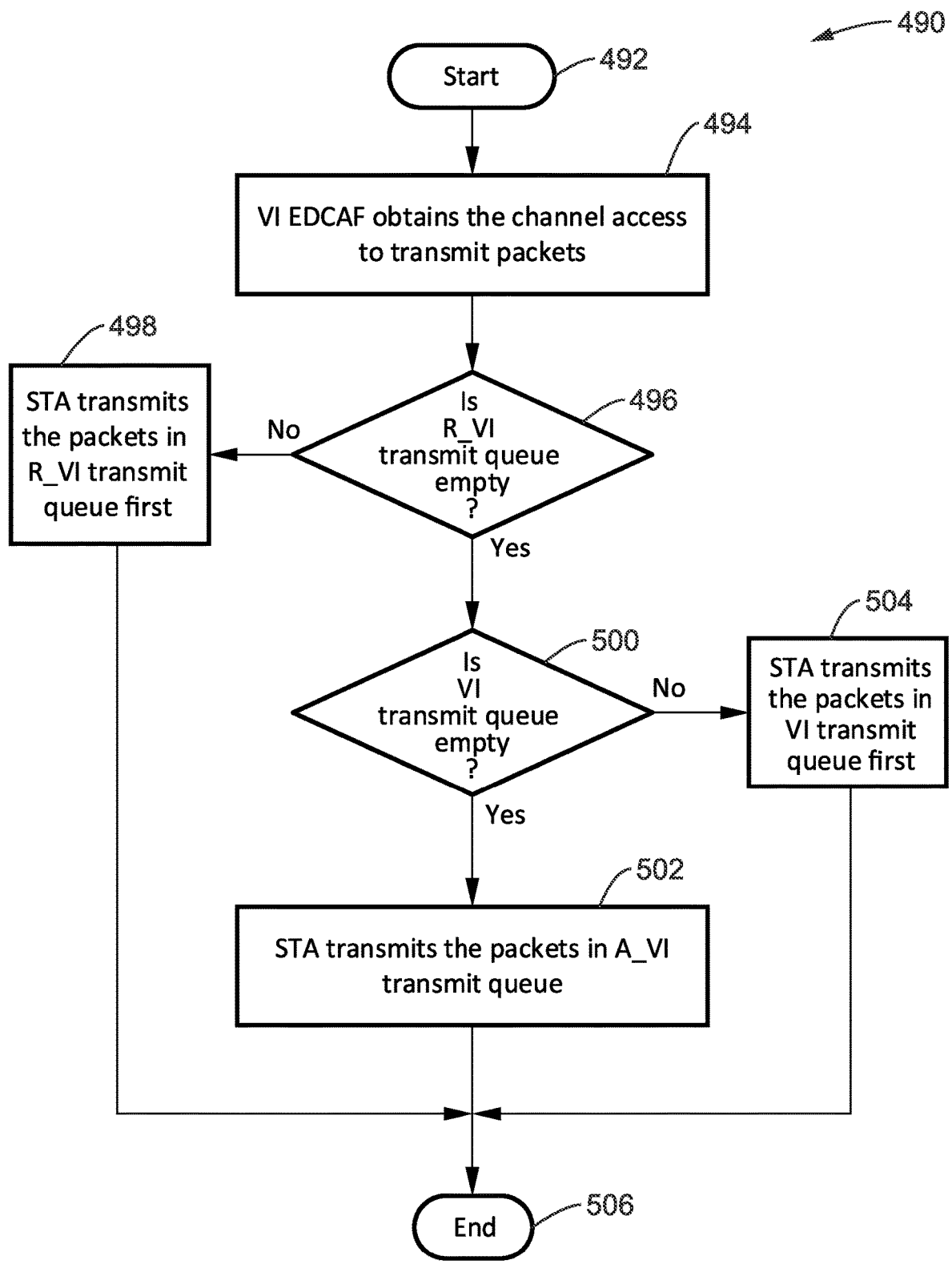
FIG. 16 is a flow diagram of a station determining from which transmit queue in the VI access class that a packet is to be transmitted from according to at least one embodiment of the present disclosure.

FIG. 16 illustrates an example embodiment 490 of a STA determining from which transmit queue to transmit a packet from. The process starts 492 and the VI EDCAF in the alternate EDCA queue for RTA has channel access 494. A check is made if the R_VI transmit queue is empty. If the R_VI transmit queue is not empty, then execution moves to block 498 and the STA transmits the packets in the R_VI transmit queue first. Otherwise, if the R_VI transmit queue is empty as determined in block 496, then execution reaches check 500 which determines if the VI queue is empty. If the VI transmit queue is not empty, then at block 504 the STA transmits the packets in the VI transmit queue first. Otherwise, if the R_VI and VI transmit queues are empty, then block 502 is reached and the STA transmits the packets in the A_VI transmit queue first. Processing ends 506 for this packet after transmission.

7. General Embodiments

The enhancements described in the presented technology can be readily implemented within various wireless network communication stations. It should also be appreciated that wireless network communication stations are preferably implemented to include one or more computer processor devices (e.g., CPU, microprocessor, microcontroller, computer enabled ASIC, etc.) and associated memory storing instructions (e.g., RAM, DRAM, NVRAM, FLASH, computer readable media, etc.) whereby programming (instructions) stored in the memory are executed on the processor to perform the steps of the various process methods described herein.

The computer and memory devices were selectively depicted for the sake of simplicity of illustration, as one of ordinary skill in the art recognizes the use of computer devices for carrying out steps involved with digital wireless communications. The presented technology is non-limiting with regard to memory and computer-readable media, insofar as these are non-transitory, and thus not constituting a transitory electronic signal.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

It should be appreciated that verbiage at the beginning and end of these flowcharts, such as "Start" and "Stop" do not infer that the instructions are confined to a specific routine, or that it has an actual start and stop, per se. The instructions may be executed without limitation within various routines, tasks, slices, threads, and so forth, and these steps can be combined with steps to perform other functions, or can be extended to provide additional functionality, without departing from the teachings of the present disclosure.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure(s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple embodiments which include, but are not limited to, the following:

1. An apparatus for wireless communication in a network, the apparatus comprising: (a) a wireless communication circuit, as a first wireless station, configured for wirelessly communicating over at least one channel with at least one other wireless station on a wireless local area network (WLAN) in a reception area of the first wireless station; (b) a processor of said first wireless station configured for enabling said first wireless station to communicate over at least one channel on the WLAN with other wireless stations; (c) a non-transitory memory storing instructions executable by the processor; and (d) wherein said instructions, when executed by the processor, perform one or more steps comprising: (d)(i) operating said wireless communication circuit as a wireless local area network (WLAN) station configured for communicating real-time application (RTA) packets that are sensitive to communication delays and communicating non-real time application (non-RTA) packets over the WLAN supporting carrier sense multiple access/collision avoidance (CSMA/CA) using enhanced distributed channel access (EDCA) in an EDCA queue system wherein RTA traffic and non-RTA traffic coexist and wherein RTA traffic is given a higher priority of transmission than lower priority traffic; (d)(ii) distinguishing RTA packets from non-RTA packets; and (d)(iii) creating at least one associated transmit queue for enqueuing RTA packets while non-RTA packets are enqueued to the original transmit queues in the EDCA queue system.

2. An apparatus for wireless communication in a network, the apparatus comprising: (a) a wireless communication circuit, as a first wireless station, configured for wirelessly communicating over at least one channel with at least one other wireless station on a local area network (WLAN) in a reception area of said first wireless station; (b) a processor of said first wireless station configured for enabling said first wireless station to communicate over the WLAN with other stations; (c) a non-transitory memory storing instructions executable by the processor; and (d) wherein said instructions, when executed by the processor, perform one or more steps comprising: (d)(i) operating said first wireless station configured for communicating real-time application (RTA) packets that are sensitive to communication delays and communicating non-real time application (non-RTA) packets over at least one channel on the WLAN supporting carrier sense multiple access/collision avoidance (CSMA/CA) using enhanced distributed channel access (EDCA) in an EDCA queue system wherein RTA traffic and non-RTA traffic coexist and wherein RTA traffic is given a higher priority of transmission than lower priority traffic; (d)(ii) distinguishing RTA packets from non-RTA packets, and setting up an RTA traffic stream (TS) for RTA traffic; (d)(iii) creating at least one new access class (AC) and at least one associated transmit queue for enqueuing RTA packets wherein non-RTA packets are enqueued to the original transmit queues in the EDCA queue system, wherein enqueued RTA packets have a higher probability of being transmitted earlier than non-RTA packets; and (d)(iv) creating a new EDCA function (EDCAF) for the new access class (AC) transmit queue for RTA packets wherein the RTA queue is able to contend for the channel before expected RTA packets arrive.

3. An apparatus for wireless communication in a network, the apparatus comprising: (a) a wireless communication circuit, as a first wireless station, configured for wirelessly communicating over at least one channel with at least one other wireless station on a wireless local area network (WLAN) in a reception area of the first wireless station; (b) a processor of said first wireless station configured for enabling said first wireless station to communicate over at least one channel on the WLAN with other stations; (c) a non-transitory memory storing instructions executable by the processor; and (d) wherein said instructions, when executed by the processor, perform one or more steps comprising: (d)(i) operating said first wireless station configured for communicating real-time application (RTA) packets that are sensitive to communication delays and non-real time (non-RTA) packets over the WLAN supporting carrier sense multiple access/collision avoidance (CSMA/CA) using enhanced distributed channel access (EDCA) in an EDCA queue system wherein real time application (RTA) traffic and non-RTA traffic coexist; (d)(ii) distinguishing RTA packets from non-RTA packets; (d)(iii) allowing EDCAF to contend for the channel for transmitting RTA packets before RTA packets arrive in the queue; (d)(iv) re-contending for the channel, if the TXOP is not obtained because the EDCAF for RTA packets has counted backoff to zero and it is determined that the RTA packets have not arrived in the EDCA queue; and (d)(v) obtaining the TXOP when the EDCAF for RTA packets counts down backoff to zero and it is determined that RTA packets have arrived in the EDCA queue.

4. An apparatus for wireless communication in a network, the apparatus comprising: (a) a wireless communication circuit configured for wirelessly communicating over at least one channel with at least one other wireless station on a local area network (WLAN) in its reception area; (b) a processor coupled to said wireless communication circuit within a station configured for operating on the WLAN; (c) a non-transitory memory storing instructions executable by the processor; and (d) wherein said instructions, when executed by the processor, perform steps comprising: (d)(i) operating said wireless communication circuit as a wireless local area network (WLAN) station configured to support communicating real-time application (RTA) packets that are sensitive to communication delays as well as non-real time packets over a network supporting carrier sense multiple access/collision avoidance (CSMA/CA) using enhanced distributed channel access (EDCA) in an EDCA queue system which real time application (RTA) traffic and non-RTA traffic coexist and RTA traffic is given a higher priority of transmission than lower priority traffic; (d)(ii) distinguishing real-time application (RTA) packets from non-real-time application (non-RTA) packets, and setting up an RTA traffic stream (TS) for RTA traffic; (d)(iii) creating at least one new access class (AC) and at least one associated transmit queue for enqueuing RTA packets while non-RTA packets are enqueued to the original transmit queues in the EDCA queue system, so that enqueued RTA packets have a higher probability of being transmitted earlier than non-RTA packets; and (d)(iv) wherein the station creates a new EDCA function (EDCAF) for the new access class (AC) transmit queue for RTA packets in which the RTA queue is able to contend for channel before expected RTA packets arrival.

5. An apparatus for wireless communication in a network, the apparatus comprising: (a) a wireless communication circuit configured for wirelessly communicating over at least one channel with at least one other wireless station on a local area network (WLAN) in its reception area; (b) a processor coupled to said wireless communication circuit within a station configured for operating on the WLAN; (c) a non-transitory memory storing instructions executable by the processor; and (d) wherein said instructions, when executed by the processor, perform steps comprising: (d)(i) operating said wireless communication circuit as a wireless local area network (WLAN) station configured to support communicating real-time application (RTA) packets that are sensitive to communication delays as well as non-real time packets over a network supporting carrier sense multiple access/collision avoidance (CSMA/CA) using enhanced distributed channel access (EDCA) in an EDCA queue system which real time application (RTA) traffic and non-RTA traffic coexist and RTA traffic is given a higher priority of transmission than lower priority traffic; (d)(ii) distinguishing real-time application (RTA) packets from non-real-time application (non-RTA) packets; (d)(iii) creating at least one associated transmit queue for enqueuing RTA packets while non-RTA packets are enqueued to the original transmit queues in the EDCA queue system; (d)(iv) mapping the RTA packets to the associated transmit queues based on the user priority of the RTA packets.

6. A method of performing wireless communication in a network, the apparatus comprising: (a) operating a wireless communication circuit as a station on a wireless local area network (WLAN) configured to support communicating real-time application (RTA) packets that are sensitive to communication delays as well as non-real time packets over a network supporting carrier sense multiple access/collision avoidance (CSMA/CA) using enhanced distributed channel access (EDCA) in an EDCA queue system which real time application (RTA) traffic and non-RTA traffic coexist and RTA traffic is given a higher priority of transmission than lower priority traffic; (b) distinguishing real-time application (RTA) packets from non-real-time application (non-RTA) packets; (c) creating at least one new access class (AC) and at least one associated transmit queue for enqueuing RTA packets while non-RTA packets are enqueued to the original transmit queues in the EDCA queue system; and (d) wherein the station creates a new EDCA function (EDCAF) for the new access class (AC) transmit queue for RTA packets in which the RTA queue is able to contend for channel before expected RTA packets arrival; and (e) wherein said method is performed by a processor executing instructions stored on a non-transitory medium.

7. A wireless communication apparatus performing transmission of packets, where CSMA/CA and EDCA queue system are applied, the real time application (RTA) traffic and non-RTA traffic coexist in the system/apparatus, comprising: (a) STA distinguishes RTA traffic and non-RTA traffic; (b) STA creates a new transmit queue for enqueuing RTA packets while non-RTA packets are enqueued to the original transmit queues in EDCA queue system; and (c) STA creates a new EDCAF (i.e., a new AC) for the new transmit queue for RTA packets which is able to contend the channel before RTA packets arrive.

8. The apparatus or method of any preceding embodiment, wherein said instructions when executed by the processor further perform one or more steps comprising distinguishing RTA and non-RTA traffic, which further comprises performing setting up an RTA traffic stream (TS) for RTA traffic.

9. The apparatus or method of any preceding embodiment, wherein said instructions when executed by the processor further perform one or more steps comprising transmitting RTA packets, from the new transmit queue for RTA packets, with a higher probability of being transmitted earlier than non-RTA packets.

10. The apparatus or method of any preceding embodiment, wherein said instructions when executed by the processor further perform one or more steps comprising transmitting non-RTA packets earlier than RTA packets with higher probability only if the non-RTA packets have higher user priority than RTA packets.

11. The apparatus or method of any preceding embodiment, wherein said instructions when executed by the processor further perform one or more steps comprising causing the EDCAF for RTA queue to transmit network control (NC) packets earlier than RTA packets when an internal collision occurs.

12. The apparatus or method of any preceding embodiment, wherein said instructions when executed by the processor further perform one or more steps comprising causing the EDCAF for RTA queue to transmit RTA packets earlier than non-RTA packets except network control (NC) packets when internal collisions occur.

13. The apparatus or method of any preceding embodiment, wherein the station distinguishing RTA and non-RTA traffic can set up an RTA-TS for RTA traffic.

14. The apparatus or method of any preceding embodiment, wherein the first station creating a new transmit queue for RTA packets transmits RTA packets earlier than non-RTA packets with higher probability when they have the same user priority.

15. The apparatus or method of any preceding embodiment, wherein the first station creating a new transmit queue for RTA packets transmits non-RTA packets earlier than RTA packets with higher probability only if the non-RTA packets have higher user priority than RTA packets.

16. The apparatus or method of any preceding embodiment, wherein the first station creating a new EDCAF for RTA queue could transmit network control (NC) packets earlier than RTA packets when the internal collision occurs.

17. The apparatus or method of any preceding embodiment, wherein the first station creates a new EDCAF for RTA queue and transmits RTA packets earlier than non-RTA packets except for NC packets when the internal collision occurs.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing group of elements, indicates that at least one of these group elements is present, which includes any possible combination of these listed elements as applicable.

References in this specification referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system or method.

As used herein, the term "set" refers to a collection of one or more objects. Thus, for example, a set of objects can include a single object or multiple objects.

As used herein, the terms "approximately", "approximate", "substantially" and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

TABLE 1

UP-to-AC Mapping Used in Reference EDCA queue of IEEE 802.11

| Priority | User Priority (UP) | IEEE 802.1D Designation | Transmit Queue | AC |
|---|---|---|---|---|
| Low | 1 | Background (BK) | BK | BK |
| ↓ | 2 | Spare (—) | BK | BK |
|  | 0 | Best Effort (BE) | BE | BE |
|  | 3 | Excellent Effort (EE) | BE | BE |
|  | 4 | Control Load (CL) | A_VI | VI |
|  | 5 | Video (VI) | VI | VI |
|  | 6 | Voice (VO) | VO | VO |
| High | 7 | Network Control (NC) | A_VO | VO |

TABLE 2

UP-to-AC Mapping (Option 1)

| Priority | Traffic UP | RTA | IEEE 802.1D Designation | Transmit Queue | AC |
|---|---|---|---|---|---|
| Low | 1 | — | BK | BK | BK |
| ↓ | 2 | — | — | BK | BK |
|  | 0 | — | BE | BE | BE |
|  | 3 | — | EE | BE | BE |
|  | 4 | — | CL | A_VI | VI |
|  | 5 | — | VI | VI | VI |
|  | 6 | No | VO | VO | VO |
|  | 6 | Yes | VO | R_VO | LL |
| High | 7 | — | Network Control (NC) | A_VO | VO |

BK = Background,
BE = Best Effort,
EE = Excellent Effort,
CL = Control Load,
VI = Video,
VO = Voice,
NC = Network Control,
LL = Low Latency

TABLE 3

UP & RTA-to-AC Mapping (Option 2)

| Priority | Traffic UP | RTA | IEEE 802.1D Designation | Transmit Queue | AC |
|---|---|---|---|---|---|
| Low | 1 | No | BK | BK | BK |
| ↓ | 2 | No | — | BK | BK |
|  | 0 | No | BE | BE | BE |
|  | 3 | No | EE | BE | BE |
|  | 4 | No | CL | A_VI | VI |
|  | 5 | No | VI | VI | VI |
|  | 6 | No | VO | VO | VO |
|  | — | Yes | — | R_VO | LL |
| High | 7 | No | NC | A_VO | VO |

BK = Background,
BE = Best Effort,
EE = Excellent Effort,
CL = Control Load,
VI = Video,
VO = Voice,
NC = Network Control,
LL = Low Latency

TABLE 4

Traffic-to-AC Mapping (Option 3)

| Priority | Traffic UP | RTA | IEEE 802.1D Designation | Transmit Queue | AC |
|---|---|---|---|---|---|
| Low | 1 | No | BK | BK | BK |
| ↓ | 2 | No | — | BK | BK |
|  | 0 | No | BE | BE | BE |
|  | 3 | No | EE | BE | BE |
|  | 4 | No | CL | A_VI | VI |
|  | 5 | No | VI | VI | VI |
|  | 5 | Yes | VI | R_VI | VI |
|  | 6 | No | VO | VO | VO |
|  | 6 | Yes | VO | R_VO | VO |
| High | 7 | No | NC | A_VO | VO |

BK = Background,
BE = Best Effort,
EE = Excellent Effort,
CL = Control Load,
VI = Video,
VO = Voice,
NC = Network Control,
LL = Low Latency

What is claimed is:

1. An apparatus for wireless communication in a network, the apparatus comprising:
    (a) a wireless communication circuit, as a first wireless station, configured for wirelessly communicating over at least one channel with at least one other wireless station on a wireless local area network (WLAN) in a reception area of the first wireless station;
    (b) a processor of said first wireless station configured for enabling said first wireless station to communicate over at least one channel on the WLAN with other wireless stations;
    (c) a non-transitory memory storing instructions executable by the processor; and
    (d) wherein said instructions, when executed by the processor, perform one or more steps comprising:
        (i) operating said wireless communication circuit as a wireless local area network (WLAN) station configured for communicating real-time application (RTA) packets that are sensitive to communication delays and communicating non-real time application (non-RTA) packets over the WLAN supporting carrier sense multiple access/collision avoidance (CSMA/CA) using enhanced distributed channel access (EDCA) in an EDCA queue system wherein RTA traffic and non-RTA traffic coexist and wherein RTA traffic is given a higher priority of transmission than lower priority traffic;
        (ii) establishing an RTA traffic stream (TS) in an RTA-TS setup procedure for scheduling transmission of the RTA packets;
        (iii) distinguishing the RTA packets from the non-RTA packets based on identifying if the packet is part of the RTA TS;
        (iv) creating at least one associated transmit queue for enqueuing the RTA packets while the non-RTA packets are enqueued to the original transmit queues in the EDCA queue system; and
        (v) wherein an EDCA function (EDCAF) for controlling said at least one associated transmit queue for RTA packets is configured for contending for the channel to transmit a new RTA packet even if that RTA packet has not been received yet.

2. The apparatus of claim 1, wherein said instructions when executed by the processor further perform one or more steps comprising transmitting the RTA packets, from the new transmit queue for the RTA packets, with a higher probability of being transmitted earlier than the non-RTA packets.

3. The apparatus of claim 2, wherein said instructions when executed by the processor further perform one or more steps comprising transmitting the non-RTA packets earlier than the RTA packets with higher probability only if the non-RTA packets have higher user priority than the RTA packets.

4. The apparatus of claim 1, wherein said instructions when executed by the processor further perform one or more steps comprising causing an EDCA function (EDCAF) for RTA queue to transmit network control (NC) packets earlier than the RTA packets when an internal collision occurs.

5. The apparatus of claim 1, wherein said instructions when executed by the processor further perform one or more steps comprising causing an EDCA function (EDCAF) for RTA queue to transmit the RTA packets earlier than the non-RTA packets except network control (NC) packets when internal collisions occur.

6. The apparatus of claim 1, wherein RTA traffic stream information indicates whether the RTA traffic is periodic or not periodic.

7. The apparatus of claim 1, wherein an element of RTA traffic stream information indicates priority within the RTA traffic, as all the RTA packets can share the same user priority.

8. An apparatus for wireless communication in a network, the apparatus comprising:
(a) a wireless communication circuit, as a first wireless station, configured for wirelessly communicating over at least one channel with at least one other wireless station on a wireless local area network (WLAN) in a reception area of the first wireless station;
(b) a processor of said first wireless station configured for enabling said first wireless station to communicate over at least one channel on the WLAN with other stations;
(c) a non-transitory memory storing instructions executable by the processor; and
(d) wherein said instructions, when executed by the processor, perform one or more steps comprising:
  (i) operating said first wireless station configured for communicating real-time application (RTA) packets that are sensitive to communication delays and non-real time (non-RTA) packets over the WLAN supporting carrier sense multiple access/collision avoidance (CSMA/CA) using enhanced distributed channel access (EDCA) in an EDCA queue system wherein real time application (RTA) traffic and non-RTA traffic coexist;
  (ii) creating at least one associated transmit queue for enqueuing the RTA packets while the non-RTA packets are enqueued to the original transmit queues in the EDCA queue system; wherein transmit queues for the RTA packets are separate from the queues for the non-RTA packets;
  (iii) establishing an RTA traffic stream (TS) in an RTA-TS setup procedure for scheduling transmission of the RTA packets, wherein each of said RTA packets are deterministic and are dropped if they are not transmitted before their lifetime has expired;
  (iv) distinguishing the RTA packets from the non-RTA packets based on identifying if the packet is part of an RTA TS;
  (v) allowing EDCAF to contend for the channel for transmitting the RTA packets before the RTA packets arrive in the queue;
  (vi) re-contending for the channel, if the TXOP is not obtained because the EDCAF for the RTA packets has counted backoff to zero and it is determined that the RTA packets have not arrived in the EDCA queue; and
  (vii) obtaining the TXOP when the EDCAF for the RTA packets counts down backoff to zero and it is determined that the RTA packets have arrived in the EDCA queue.

9. The apparatus of claim 8, wherein said instructions when executed by the processor further perform one or more steps comprising transmitting the RTA packets, from the new transmit queue for the RTA packets, with a higher probability of being transmitted earlier than the non-RTA packets.

10. The apparatus of claim 9, wherein said instructions when executed by the processor further perform one or more steps comprising transmitting the non-RTA packets earlier than the RTA packets with higher probability only if the non-RTA packets have higher user priority than the RTA packets.

11. The apparatus of claim 8, wherein said instructions when executed by the processor further perform one or more steps comprising causing the EDCAF for RTA queue to transmit network control (NC) packets earlier than the RTA packets when an internal collision occurs.

12. The apparatus of claim 8, wherein said instructions when executed by the processor further perform one or more steps comprising causing the EDCAF for RTA queue to transmit the RTA packets earlier than the non-RTA packets except network control (NC) packets when internal collisions occur.

13. The apparatus of claim 8, wherein RTA traffic stream information indicates whether the RTA traffic is periodic or not periodic.

14. The apparatus of claim 8, wherein an element of RTA traffic stream information indicates priority within the RTA traffic, as all the RTA packets can share the same user priority.

15. A method of performing wireless communication in a network, comprising:
(a) operating a wireless communication circuit as a wireless local area network (WLAN) station configured for communicating real-time application (RTA) packets that are sensitive to communication delays and communicating non-real time application (non-RTA) packets over the WLAN supporting carrier sense multiple access/collision avoidance (CSMA/CA) using enhanced distributed channel access (EDCA) in an EDCA queue system wherein RTA traffic and non-RTA traffic coexist and wherein RTA traffic is given a higher priority of transmission than lower priority traffic;
(b) establishing an RTA traffic stream (TS) in an RTA-TS setup procedure for scheduling transmission of the RTA packets;
(c) distinguishing the RTA packets from the non-RTA packets based on identifying if the packet is part of an RTA TS;
(d) creating at least one associated transmit queue for enqueuing the RTA packets while the non-RTA packets are enqueued to the original transmit queues in the EDCA queue system; and
(e) controlling said at least one associated transmit queue for RTA packets, by an EDCA function (EDCAF) configured for contending for the channel to transmit a new RTA packet even if that RTA packet has not been received yet.

16. The method of claim 15, wherein the RTA packets of the RTA traffic stream (TS) are deterministic and are dropped if they are not transmitted before their lifetime has expired.

17. The method of claim 15, further comprising incorporating RTA traffic stream information which indicates: (a) whether the RTA traffic is periodic or not periodic, or (b) indicating a priority within the RTA traffic which is distinct from user priority, or (c) indicating both whether the RTA traffic is periodic or not periodic, and a priority within the RTA traffic which is distinct from user priority.

18. The method of claim 15, wherein said instructions when executed by the processor further perform one or more steps comprising transmitting the RTA packets, from the new transmit queue for the RTA packets, with a higher probability of being transmitted earlier than the non-RTA packets.

19. The method of claim 18, wherein said instructions when executed by the processor further perform one or more steps comprising transmitting the non-RTA packets earlier than the RTA packets with higher probability only if the non-RTA packets have higher user priority than the RTA packets.

20. The method of claim 15, further comprising (a) an EDCA function (EDCAF) for an RTA queue transmitting network control (NC) packets earlier than the RTA packets when an internal collision occurs; or (b) the EDCAF for the RTA queue transmitting the RTA packets earlier than the non-RTA packets, except network control (NC) packets, when internal collisions occur.

* * * * *